US012760703B2

(12) United States Patent
Collins

(10) Patent No.: US 12,760,703 B2

(45) Date of Patent: Oct. 13, 2026

(54) HYDRAULIC DEVICE AND A HYDRAULIC SYSTEM FOR CONTROLLING A HYDRAULIC ACTUATOR

(71) Applicant: DOMIN FLUID POWER LIMITED, Bristol (GB)

(72) Inventor: Andrew John Collins, Bristol (GB)

(73) Assignee: DOMIN FLUID POWER LIMITED, Bristol (GB)

(*) Notice: Subject to any disclaimer, the term of this patent is extended or adjusted under 35 U.S.C. 154(b) by 0 days.

(21) Appl. No.: 18/861,705

(22) PCT Filed: May 2, 2023

(86) PCT No.: PCT/GB2023/051157

§ 371 (c)(1),
(2) Date: Oct. 30, 2024

(87) PCT Pub. No.: WO2023/214157

PCT Pub. Date: Nov. 9, 2023

(65) Prior Publication Data

US 2025/0277497 A1 Sep. 4, 2025

(30) Foreign Application Priority Data

May 3, 2022 (GB) ..................................... 2206454

(51) Int. Cl.

*F03C 1/34* (2006.01)
*F03C 1/047* (2006.01)

(Continued)

(52) U.S. Cl.

CPC .......... *F03C 1/0435* (2013.01); *F03C 1/0409* (2013.01); *F03C 1/0472* (2013.01);

(Continued)

(58) Field of Classification Search

CPC .... F03C 1/0409; F03C 1/0435; F03C 1/0472; F04B 1/0413; F04B 1/0452; F04B 1/0472; F15B 15/18

See application file for complete search history.

(56) References Cited

U.S. PATENT DOCUMENTS 4,068,560 A * 1/1978 Orloff .................. F03C 1/0409 91/36
5,190,447 A * 3/1993 Schneider .............. F04B 17/03 417/270

(Continued)

FOREIGN PATENT DOCUMENTS

CN 201771880 U 3/2011
CN 203808126 U 9/2014

(Continued)

OTHER PUBLICATIONS

International Search Report and Written Opinion corresponding to Application No. PCT/GB2023/051157, dated Sep. 7, 2023, 20 pages.

(Continued)

*Primary Examiner* — Matthew Wiblin

(74) *Attorney, Agent, or Firm* — Day Pitney LLP; George Chaclas; Christopher J. Head

(57) ABSTRACT

A hydraulic device comprising a piston arrangement having a plurality of pistons arranged to reciprocate within a respective cylinder. The reciprocation is driven by a rotatable piston drive element. Each piston is associated with a piston switching valve, and each piston switching valve is configured to control fluid flow into and out of the cylinder of the associated piston. A controller is configured to control the piston switching valves. Each of the piston switching valves is configurable between a first configuration in which the associated cylinder is in communication with a first port, and a second configuration in which the associated cylinder (Continued)

is in communication with a second port. The controller is configured to change the configuration of each piston switching valve for each in-stroke and out-stroke of the associated piston.

19 Claims, 12 Drawing Sheets

(51) Int. Cl.

| | |
|---|---|
| ***F03C 1/30*** | (2006.01) |
| ***F04B 1/0413*** | (2020.01) |
| ***F04B 1/0452*** | (2020.01) |
| ***F04B 1/0472*** | (2020.01) |
| ***F15B 15/18*** | (2006.01) |

(52) U.S. Cl.
CPC .......... *F04B 1/0413* (2013.01); *F04B 1/0452* (2013.01); *F04B 1/0472* (2013.01); *F15B 15/18* (2013.01)

(56) References Cited

U.S. PATENT DOCUMENTS

| | | | | |
|---|---|---|---|---|
| 6,575,078 | B1 * | 6/2003 | Wright | F01B 9/06<br>417/500 |
| 6,651,545 | B2 * | 11/2003 | Nippert | F04B 1/063<br>91/476 |
| 9,074,578 | B2 * | 7/2015 | Souply | F03C 1/247 |
| 2006/0142107 | A1 | 6/2006 | Kobayashi et al. | |
| 2008/0022672 | A1 * | 1/2008 | He | F15B 1/265<br>60/413 |
| 2018/0022179 | A1 * | 1/2018 | Collins | B60G 17/0424<br>280/5.5 |
| 2018/0291895 | A1 * | 10/2018 | Afshari | F04C 14/08 |
| 2020/0080541 | A1 * | 3/2020 | Bourgault | F04B 1/0421 |
| 2022/0128053 | A1 * | 4/2022 | Schmidt | F04B 19/022 |

FOREIGN PATENT DOCUMENTS

| | | | |
|---|---|---|---|
| CN | 106762903 | A | 5/2017 |
| CN | 108953275 | A | 12/2018 |
| DE | 282953 | A5 | 9/1990 |
| EP | 3561298 | A1 | 10/2019 |
| GB | 2611506 | A | 4/2023 |
| JP | 6185669 | A | 8/1994 |
| WO | 9003519 | A1 | 4/1990 |
| WO | 9105163 | A1 | 4/1991 |
| WO | 0006869 | A1 | 2/2000 |
| WO | 2017098250 | A1 | 6/2017 |

OTHER PUBLICATIONS

Caldwell, Dr. Niall, “Digital Displacement Technology”, Artemis Intelligent Power Presentation, 86 pages (Jul. 8, 2024).

Helgerson, Dan, “Digital Displacement Pumps”, Fluid Power Journal, 2022, 6 pages.

Caldwell, Niall James, “Digital Displacement Hydrostatic Transmission Systems”, Artemis Intelligent Power, 2007, 459 pages.

Heikkila, M. et al., “Hydraulic Energy Recovery in Displacement Controlled Digital Hydraulic System”, The 13th Scandinavian International Conference on Fluid Power, SIFCP2013, Jun. 3-5, 2013, 7 pages.

GB Search Report corresponding to Application No. GB2206454.7, dated Oct. 10, 2022, 5 pages.

* cited by examiner

HYDRAULIC DEVICE AND A HYDRAULIC SYSTEM FOR CONTROLLING A HYDRAULIC ACTUATOR

CROSS-REFERENCE TO RELATED APPLICATIONS

The present application is a U.S. National Stage Application of International Application No. PCT/GB2023/051157 filed May 2, 2023 and published on Nov. 9, 2023 as WO2023/214157A1, which claims benefit and priority of Great Britain Patent Application No. GB2206454.7 filed on May 3, 2022, each of which is incorporated herein by reference in its entirety for any purpose whatsoever.

FIELD OF THE DISCLOSURE

The present disclosure concerns a hydraulic device in the form of a pump, motor or pump/motor. The present disclosure also concerns a hydraulic system for controlling a hydraulic actuator. More particularly, but not exclusively, this disclosure concerns a hydraulic system configured to transfer energy between a load and an energy storage device, such as an accumulator.

BACKGROUND OF THE DISCLOSURE

A reciprocating piston pump comprises at least one piston arranged to reciprocate in a cylinder in a series of in-strokes and out-strokes. During an in-stroke (i.e. intake stroke), a fluid flows into the cylinder from a lower-pressure inlet; and during an out-stroke (i.e. discharge stroke), the fluid is forced out of an outlet at a higher pressure which proportional to the force applied by the piston. A valve arrangement ensures the correct direction of fluid flow through the pump.

Multi-chamber piston pumps comprise a plurality of reciprocating pistons. Known examples include axial piston pumps and radial piston pumps. Axial piston pumps typically comprises a plurality of parallel pistons and cylinders, where the pistons are caused to reciprocate by a swashplate. Radial piston pumps typically comprise a plurality of radially arranged pistons and cylinders, where the pistons are caused to reciprocate by a relative rotational movement of a drive element such as a cam.

Radial piston pumps can be externally (i.e. outside) impinged or internally (i.e. inside) impinged. Externally impinged radial piston pumps comprise a drive element which is located inwardly of the radial piston arrangement. Thus an external surface of the drive element engages with the pistons. Internally impinged radial piston pumps comprise a drive element which is located outwardly of the radial piston arrangement. Thus an internal surface of the drive element engages with the pistons.

It is known to control the output of such multi-chamber piston pumps by selectively permitting and preventing the pistons from pumping fluid through the respective outlet. This may be achieved by keeping an outlet valve closed and holding an inlet valve open during the out-stroke, such that the fluid taken into the cylinder during the in-stroke is simply pumped back out through the inlet.

WO90/03519 discloses a multi-chamber piston pump in which the fluid flow into and out of a cylinder is controlled by a poppet valve which is actuated by a solenoid coil. The pump comprises a controller which decides, on a stroke-by-stroke basis, whether to "enable" or "disable" each piston on the basis of a displacement demand or a measured system pressure. If it is determined that more fluid is required to be pumped in order to meet the demand or desired pressure, the next piston to reach a "bottom dead centre" position is "enabled" using the solenoid coil such that fluid is pumped to the outlet. The pistons which remain "disabled" simply pump the fluid back out through the inlet. Electronically controlled multi-chamber piston pumps of the type described in WO90/03519 are now commonly referred to as "Digital Displacement Pumps" (DDP).

A hydraulic motor is a device which converts hydraulic pressure and flow into rotary motion, for example of a drive shaft. It is known for some multi-chamber piston devices to also be operable as hydraulic motors. When operating as a hydraulic motor, higher-pressure fluid is provided into the cylinder during the in-stroke, thereby driving the piston and drive element. The fluid is then exhausted to a lower-pressure outlet during the out-stroke. The motor output (e.g. torque) can be controlled by selectively permitting and preventing (i.e. enabling and disabling) the pistons from receiving fluid from the higher-pressure inlet. Electronically controlled multi-chamber piston motors of this type are now commonly referred to as "Digital Displacement Motors" (DDM).

Hydraulic devices which can be operable both as pumps and motors are commonly referred to as "pump motors", "pump-motors" and "pump/motors". It will be appreciated that not all hydraulic pumps can be used as hydraulic motors, and vice versa, as some devices are non-backdrivable. Electronically controlled multi-chamber piston devices which have both pumping and motoring functionality are now commonly referred to as "Digital Displacement Pump/Motors" (DDPM).

"Digital displacement hydrostatic transmission systems", N. J. Caldwell, The University of Edinburgh, 2007, provides a more detailed background discussion of DDPM devices and their development.

A hydraulic transformer is a device that can transfer power between two separate hydraulic circuits, without the need to transfer hydraulic fluid between those circuits. Known hydraulic transformers comprise two hydraulic pump/motor devices which are mechanically connected so that they rotate together. One of the devices acts as a motor, which is driven by fluid flow in one hydraulic circuit; and the other device acts as a pump, which drives fluid flow in a second hydraulic circuit. Hydraulic transformers can be used to transform pressure and flow at the input to a different pressure and flow at the output. It is known that multiple DDPM units can be connected on a common shaft to work together as a hydraulic transformer.

It is also known for multi-chamber piston pump/motors, including DDPM devices, to be used to recover energy from a load for later re-use. Typically, the action of the load pressurises fluid in one hydraulic circuit which is used to drive some of the pistons in "motoring" cycles. At the same time, the other pistons carry out pumping cycles in which they pump hydraulic fluid into an accumulator so as to store energy. The energy in the accumulator can subsequently be released and used to drive the load. This is achieved by the pressurised hydraulic fluid from the accumulator driving some of the pistons in motoring cycles, whist the other pistons in communication with the hydraulic circuit associated with the load function as pumps.

"Hydraulic Energy Recovery in Displacement Controlled Digital Hydraulic System", M. Heikkiläet al., The 13th Scandinavian International Conference on Fluid Power, SICFP2013, Jun. 3-5, 2013, Linköping, Sweden, describes a study into the use of a multi-cylinder piston pump/motor as a hydraulic transformer for recovering energy when an excavator boom is lowered. An accumulator is charged when the boom is lowered in order to store the recovered energy. The energy from the accumulator can subsequently be released to drive the actuator which lifts the boom.

A problem with known electronically controlled multi-piston devices (e.g. pumps, motors and pump/motors), is that they are relatively large and there are limitations on the switching speeds of the solenoid controlled valves typically used to enable and disable the cylinders of the pumps. Furthermore, there are limitations on the speed in which a multi-cylinder piston pump/motor can transfer energy stored in an accumulator to a load.

The present disclosure seeks to mitigate the above-mentioned problems. Alternatively or additionally, the present disclosure seeks to provide an improved hydraulic pump, motor and/or pump/motor. Alternatively or additionally, the present disclosure seeks to provide an improved hydraulic system for controlling a hydraulic actuator.

SUMMARY

The present disclosure provides, according to a first aspect, a hydraulic device in the form of a pump, motor or pump/motor, the hydraulic device comprising: a piston arrangement comprising a plurality of pistons, wherein each piston is arranged to reciprocate within a cylinder in a cycle comprising an in-stroke wherein fluid flows into the cylinder and an out-stroke wherein fluid flows out of the cylinder, wherein the reciprocation of the pistons is collectively driven by a rotatable piston drive element; a piston switching valve arrangement comprising a plurality of piston switching valves, wherein each piston is associated with one of the piston switching valves, wherein each piston switching valve is configured to control fluid flow into and out of the cylinder of the associated piston; and a (e.g. electronic) controller configured to (e.g. electronically) control the piston switching valves.

At least one of the piston switching valves may have a first configuration in which the associated cylinder is in fluid communication with a first port. The first configuration may be a service configuration. The first port may be a service port. The service port may be for and/or in fluid connection to an actuator control valve. The service port may be for and/or in fluid connection to a hydraulic actuator.

At least one of the piston switching valves may have a second configuration in which the associated cylinder is in fluid communication with a second port. The second configuration may be a return configuration. The second port may be a return port. The return port may be for and/or in fluid connection to a hydraulic reservoir.

At least one of the piston switching valves may have a third configuration in which the associated cylinder is in fluid communication with a third port. The third configuration may be a storage configuration. The third port may be a storage port. The service port may be for and/or in fluid connection to an energy storage device.

The piston switching valves may be located within a piston switching valve manifold. The first, second and/or third ports may be formed in the switching valve manifold. The cylinders may also be located within the same manifold.

Each of the piston switching valves may be configurable between at least two of the configurations, and optionally three of the configurations.

The controller may be configured such that it can change the configuration of each piston switching valve for each in-stroke and out-stroke of the associated piston. The controller may be configured such that it can change the configuration of each piston switching valve on a stroke-by-stroke basis. The controller may be configured such that it can change the configuration of each piston switching valve at least once per stroke of the associated piston. The controller may be configured such that it can change the configuration of each piston switching valve at the beginning of the in-stroke and/or the out-stroke of the associated piston. The controller may be configured such that it can change the configuration of each piston switching valve when the associated piston is at a top dead centre and/or a bottom dead centre position.

The controller may be configured to calculate, in use, which configuration each piston switching valve should adopt in order to meet a demand. The calculation may be performed in advance of each in-stroke and/or out-stroke of each piston. Accordingly, it will be appreciated that the calculation may be repeatedly performed as the drive element rotates. The controller may be configured to cause each piston switching valve to adopt the calculated configuration, for example by either changing or maintaining the configuration of the piston switching valve. The demand may be a target position, for example of the hydraulic actuator. The demand may be a target velocity, for example of the hydraulic actuator. The demand may be a target force, for example of the hydraulic actuator. The demand may be a target pressure, for example at an output of the hydraulic device. The calculation may be based on an error between the demand and a measured value.

The controller may be configured to calculate, on the basis of the demand, which configuration should be adopted by the piston switching valve associated with the next piston to begin an in-stroke or an out-stroke. The calculation may be made with the aim of reducing the error between the demand and the measured value.

It will be appreciated that the controller is an electric and/or electronic device, for example comprising a processor and/or a memory.

In embodiments, each of the piston switching valves is configurable between the first configuration in which the associated cylinder is in fluid communication with the first port, the second configuration in which the associated cylinder is in fluid communication with the second port, and the third configuration in which the associated cylinder is in fluid communication with the third port.

The use of piston switching valves having three configurations (e.g. three-way valves) may allow each piston to be individually connected to three hydraulic circuits. Each piston may therefore be connected, during each stroke (either the in-stroke or the out-stroke), to either a hydraulic actuator, a hydraulic reservoir, or an energy storage device (e.g. an accumulator). The controller may be able to determine, for each piston, at each stroke, whether to pump fluid to or receive fluid from each of these elements.

It will be appreciated that, if the cylinder receives fluid from a pressurised source (e.g. the hydraulic actuator or the energy storage device) during the in-stroke, that stroke will be a "motoring" stroke where kinetic energy is added to the drive element. It will be appreciated that, if the cylinder pumps fluid to a pressurised source during the out-stroke, that stroke will be a "pumping" stroke where kinetic energy is removed from the drive element. The energy lost from the drive element may then be used to do work on a load moved by the hydraulic actuator, or increase the potential energy of the energy storage device. The controller may be able to determine, for each piston, at each stroke, whether to carry out a pumping stroke or a motoring stroke.

If the cylinder receives fluid from the hydraulic reservoir during the in-stroke, and pumps the same fluid back to the hydraulic reservoir, the piston may be referred to as “idling”. It may be that when the piston is idling, substantially no kinetic energy, or only a negligible amount of kinetic energy, is added to or removed from the drive element.

In embodiments, a first of the piston switching valves is configurable between the first configuration in which the associated cylinder is in fluid communication with the first port, and the second configuration in which the associated cylinder is in fluid communication with the second port; and a second of the piston switching valves is configurable between the second configuration in which the associated cylinder is in fluid communication with the second port, and the third configuration in which the associated cylinder is in fluid communication with the third port.

The use of piston switching valves having two configurations (e.g. two-way valves) may allow each piston to be individually connected to two hydraulic circuits. A first of the pistons, associated with the first of the piston switching valves, may be connected, during each stroke (either the in-stroke or the out-stroke), to either a hydraulic actuator or a hydraulic reservoir. The controller may therefore be able to determine, for the first of the pistons, at each stroke, whether to pump fluid to or receive fluid from the hydraulic actuator or the hydraulic reservoir. A second of the pistons, associated with the second of the piston switching valves, may be connected, during each stroke (either the in-stroke or the out-stroke), to either an energy storage device or a hydraulic reservoir. The controller may therefore be able to determine, for the second of the pistons, at each stroke, whether to pump fluid to or receive fluid from the energy storage device or the hydraulic reservoir.

Embodiments comprising piston switching valves having three configurations may be advantageous, in comparison to embodiments comprising piston switching valves having only two configurations, because the pistons do not need to be allocated to different and specific functions. Therefore, for each rotation of the drive element, all the pistons can, for example, receive fluid from the energy storage device on their in-stroke, and pump fluid to the hydraulic actuator on their out-stroke. Therefore, for a hydraulic device with any given number of pistons, the rate of energy and fluid transfer around the hydraulic system can be increased.

It may be possible to make a two-configuration (e.g. two-way) piston switching valve having a more efficient fluid flow path (i.e. having less resistance to fluid flow) in comparison to a three-configuration (e.g. three-way) piston switching valve. Therefore, embodiments comprising piston switching valves having two configurations, where the functions of managing flow between the hydraulic actuator and the energy storage device are allocated to different pistons, may be more suited to higher power applications.

The piston switching valves may be spool valves, for example linear spool valves or rotary spool valves. The configuration of each spool valve may be defined by the position, for example the linear position or angular position, of a spool relative to a manifold. In the first configuration of the piston switching valve, the spool may have a first position. In the second configuration of the piston switching valve, the spool may have a second position. In the third configuration of the piston switching valve, the spool may have a third position.

Each position switching valve may be actuated by a motor, for example an electric motor. Each position switching valve may be individually actuated by a separate motor. The motor may drive the spool. The motor may directly drive the spool. In alternative embodiments, the motor may drive the spool via a mechanical transmission, for example a gearbox.

In embodiments, the piston switching valve may change between configurations by the motor (and optionally the spool) rotating in two directions, for example both a first direction and a second direction (e.g. both clockwise and anticlockwise). The motor (and optionally the spool) may therefore reciprocate (oscillate) back and forth when changing the piston switching valve between configurations.

In alternative embodiments, the piston switching valve may change between configurations by the motor (and optionally the spool) rotating in (e.g. only) one direction, for example (e.g. only) a first direction (e.g. clockwise or anticlockwise). The rotation in the first direction may be continuous. The motor (and optionally the spool) may therefore spin around in one direction when changing the piston switching valve between configurations.

In the case of a linear spool valve, the motor may drive the spool via a mechanism which converts rotary motion of the motor into linear motion of the spool. The motor may be arranged to drive movement of the spool via a crank mechanism. The crank mechanism may be configured to convert rotary motion provided by the motor into linear motion of the spool.

The hydraulic device may comprise a plurality of position sensors (e.g. angular position sensors). Each spool may be associated with one of the position sensors. The angular position sensor my sense the angular position of the spool and/or the motor driving the spool.

Spool valves may be capable of withstanding high speed movement, and they may have relatively low leakage. The use of spool valves, rather than solenoid actuated poppet valves of the prior art, may have advantages. For example, the manifold/housing of the hydraulic device does not need to provide space for the solenoid coils and associated circuitry around the valve member. The spool valves can be actuated by motors which are offset from the spool. This may allow a more compact design and/or provide more design freedom.

Preferably, the hydraulic device does not comprise any form of mechanical mechanism which creates a mechanical interdependence between the configuration/movement of each piston switching valve (e.g. the position/movement of each spool) and the position/movement of the piston drive element and/or associated piston(s). It may be that the configuration of each piston switching valve can be changed (e.g. under the control of the controller) independently of the position of the piston drive element and/or the associated piston(s). It may be that the spool of each piston switching valve can be moved (e.g. under the control of the controller) independently to the piston drive element and/or associated piston(s).

The hydraulic device may be a radial piston pump, motor or pump/motor. The plurality of pistons and cylinders may be in a radial arrangement. The pistons and cylinders may extend in a radial direction. The pistons and cylinders may extend radially away from an axis of rotation of the drive element. Each piston may reciprocate along an axis of reciprocation. Each axis of reciprocation may extend in a radial direction.

There may be at least three pistons, at least six pistons, or at least twelve pistons. The pistons may be paired up, wherein both pistons of the pair are associated with (i.e. have the flow of fluid into and out of the associated cylinder controlled by) the same piston switching valve. There may be two pistons associated with each of the piston switching valves. The pistons associated with the same piston switching valve may reciprocate in-phase. The pistons associated with the same piston switching valve may be arranged diametrically opposite each other. Each of the pistons and cylinders may be located in the same plane, said plane being perpendicular to the axis of rotation of the drive element.

For example, there may be twelve pistons and six piston switching valves. The twelve pistons may be paired up, such that two pistons are associated with any one switching valve. The pistons belonging to the same pair may reciprocate in-phase, and also be in-phase with one other pair. Another two pairs of pistons may be 120 out of phase, and another two pairs of pistons may be 240 degrees out of phase.

The piston arrangement may be externally (i.e. outside) impinged. In such embodiments, the drive element may be located inwardly of the piston arrangement. In such embodiments, an external surface of the drive element may engage with the pistons to drive the pistons. In such embodiments, the cylinder may be filled with fluid from the outside and/or the surface of the piston which acts on the fluid in the cylinder may face outwardly. With an externally impinged piston arrangement, it may be more straightforward to route the fluid flow channels from the cylinders to the piston switching valves, as the flow channels may be outside of the drive element and at a greater radius where there is naturally more space.

The piston arrangement may be internally (i.e. inside) impinged. In such embodiments, the drive element may be located outwardly of the radial piston arrangement. In such embodiments, an internal surface of the drive element may engage with the pistons to drive the pistons. In such embodiments, the cylinder may be filled with fluid from the inside and/or the surface of the piston which acts on the fluid in the cylinder may face inwardly. Internally impinged piston arrangements may be advantageous as they allow the mechanical contact stresses between the pistons and the drive element to be at a larger radius, and therefore distributed over a larger area.

The flow channels from the piston arrangement to the piston switching valves may be provided in a manifold, for example the piston switching valve manifold, which is formed by an additive manufacturing process. Additive manufacturing may allow the flow channels to be tightly packed and/or shaped to improve the efficiency of fluid flow (e.g. by avoiding abrupt changes of direction, which may lead to cavitation). An additive manufactured manifold may have particular advantages in embodiments comprising an inwardly impinged piston arrangement, as the available space for said flow channels is much lower. The manifold may be formed as a single piece.

The drive element may be a cam. The position of each piston in the cylinder may be determined by the angular position of the cam relative to the piston arrangement. The cam may have a cam surface which engages the pistons. The cam surface may comprise changes of radius (e.g. undulations/lobes) which drive the pistons to reciprocate. The pistons may each comprise a roller. The cam (surface) may engage the pistons via the rollers.

The cam (surface) may be arranged such that during each revolution of the cam, each piston is driven to complete more than one cycle (comprising an in-stroke and out-stroke). For example, the cam (surface) may be arranged such that during each revolution of the cam, each piston completes two, three, four, or more than four cycles. Such a cam may be referred to as a multi-lobe cam. Using such a cam may allow the forces on the cam to be more balanced. Using such a cam may allow each piston to reciprocate more frequently at any given rotational speed of the cam, which may allow a higher fluid throughput. The cam (surface) may be arranged such that diametrically opposite pistons reciprocate in-phase. This may further balance the forces on the cam.

The cam may be a ring cam. The ring cam may surround (i.e. extend around) the plurality of pistons. The cam surface may be an inside surface of the ring cam. Each piston may be resiliently biased, for example with a spring, in a direction towards the cam surface.

The centre of the ring cam may be aligned with the axis of rotation, that is to say, the ring cam is not eccentrically mounted. The inside surface of the ring cam may comprise the changes of radius (e.g. undulations/lobes) which drive the pistons to reciprocate. An outer surface of the ring cam may have a circular shape.

The cam surface may be shaped such that the cycle comprises a period of dwell between the in-stroke and the out-stroke. The period of dwell may provide more available time between the in-stroke and the out-stroke to change the configuration of the piston switching valve. This may help avoid problems, such as cavitation or energy loss, associated with opening the cylinder to the new output too early or too late during the stroke. During the period of dwell the piston may be stationary or substantially stationary (i.e. moves a negligible distance relative to the cylinder).

When pumping fluid from a lower-pressure input (e.g. from the hydraulic reservoir) to a higher-pressure output (e.g. to the hydraulic actuator or energy storage device), it may be beneficial to pre-compress the fluid in the cylinder before opening the piston switching valve during the out-stroke. Preferably, the fluid would be pre-compressed such that the pressure in the cylinder matches the upstream pressure. Similarly, when pumping fluid from a higher-pressure input to a lower-pressure output, it may be beneficial to decompress the fluid in the cylinder before opening the piston switching valve during the out-stroke.

Each piston switching valve may comprise a closed configuration, wherein the associated cylinder is not open to any of the first port, second port or third port (as the case may be). Each cycle of a piston may comprise a pre-compression phase wherein the fluid in the cylinder is pre-compressed before the piston switching valve is opened. Each cycle of a piston may comprise a decompression phase wherein the fluid in the cylinder is decompressed before the piston switching valve is opened. The piston switching valves may be in the closed configuration during the periods of pre-compressing or decompressing the fluid in the cylinder. The period of dwell may provide more available time to both achieve the pre-compression or decompression of the fluid and open the piston switching valve to a new output.

Pre-compressing and/or decompressing the fluid may improve the efficiency of the hydraulic device and/or reduce the operating noise. For example, by decompressing the fluid before the cylinder is opened to the hydraulic reservoir, the elastic potential energy stored in the fluid and the piston/cylinder can be recovered to the drive element, rather than lost to the hydraulic reservoir.

The point in the cycle (i.e. the phase angle) at which the piston switching valves open, and therefore the amount of pre-compression or decompression, may be determined in advance (e.g. empirically) and stored in the controller. Alternatively, the point in the cycle at which the piston switching valves open, and therefore the amount of pre-compression or decompression, may be determined based on feedback from the system. For example, the point of opening may be based on a measured value, such as pressure, noise and/or efficiency. The controller may comprise a control loop (e.g. a closed control loop or an open control loop) to adjust the point in the cycle at which the piston switching valves open based on said feedback.

The drive element, for example the cam, may be driven by a motor, for example an electric motor. The drive element may be directly driven by the motor. The electric motor may be an outer rotor (i.e. external rotor) electric motor, where the rotor is outward of the stator. The electric motor may be a brushless DC electric motor. The rotor may be mounted in a fixed relation to the drive element.

The piston arrangement may comprise a plurality of pistons arranged in a first plane perpendicular to a rotational axis of the drive element, and plurality of pistons arranged in a second plane perpendicular to the rotational axis of the drive element. Thus, the piston arrangements may comprise a plurality of layers of pistons. In embodiments, the plurality of layers are driven by the same drive element, and thus by the same motor. In alternative embodiments, the plurality of layers are driven by different drive elements. For example, there may be a different ring cam per layer of pistons.

The present disclosure provides, according to a second aspect, a hydraulic system for controlling a hydraulic actuator, the hydraulic system comprising a hydraulic device according to the first aspect. The hydraulic device may be in the form of a pump or a pump/motor (i.e. a device operable as both a pump and a motor).

The hydraulic system may comprise an energy storage device. The hydraulic system may comprise a storage network comprising one or more fluid flow channels in fluid communication with the third (e.g. storage) ports of the piston switching valves and with the energy storage device. The storage device may be configured to store energy upon receipt of hydraulic fluid. The storage device may be configured to release energy by delivering hydraulic fluid (e.g. pressurised hydraulic fluid). The energy storage device may be an accumulator. The accumulator may be a gas-charged (i.e. hydro-pneumatic) accumulator. The hydraulic fluid in the storage network may be pressurised by the action of the energy storage device.

The hydraulic system may comprise a hydraulic fluid reservoir for storing hydraulic fluid at a return pressure. The hydraulic system may comprise a return network comprising one or more fluid flow channels in fluid communication with the second (e.g. return) ports of the piston switching valves and with the hydraulic fluid reservoir. The hydraulic fluid reservoir may store hydraulic fluid at a return pressure. The hydraulic fluid reservoir may store hydraulic fluid at a pressure above atmospheric pressure, but below the pressure in the storage network and/or energy storage device. Pressurising the hydraulic fluid in the hydraulic fluid reservoir and the return network may help prevent cavitation in the hydraulic system.

The hydraulic fluid reservoir may be a bootstrap reservoir. The bootstrap reservoir may comprise a piston having a higher pressure (lower surface area) face which is acted on by hydraulic pressure of the hydraulic fluid in the storage network, and a lower pressure (higher surface area) face which acts on the hydraulic fluid in the hydraulic fluid reservoir.

The hydraulic system may comprise an actuator control valve for controlling a flow of hydraulic fluid to the hydraulic actuator. The hydraulic system may comprise a service network comprising one or more fluid flow channels in fluid communication with the first (e.g. service) ports of the piston switching valves and with the actuator control valve. In embodiments, there may be no actuator control valve and the service network may be in fluid communication with the actuator directly.

The actuator control valve may be a spool valve (e.g. a linear spool valve). The actuator control valve may comprise a spool arranged to move relative to a manifold. The position of the spool relative to the manifold may define the configuration of the actuator control valve. The hydraulic system may comprise a position sensor to determine the position of the spool, and thus the configuration of the actuator control valve. The actuator control valve may be actuated by an electric motor. The motor may drive the spool via a mechanism which converts rotary motion of the motor into linear motion of the spool. The electric motor may be arranged to drive movement of the spool via a crank mechanism. The crank mechanism may be configured to convert rotary motion in a first direction provided by the motor into reciprocating linear motion of the spool.

The hydraulic system may be configured for four-quadrant control of the hydraulic actuator. That is to say, configured for control of the actuator during extending and driving, extending and braking, retracting and driving, and retracting and braking.

The actuator control valve may comprise a first actuator port for fluid communication with a first chamber of the hydraulic actuator. The actuator control valve may comprise a second actuator port for fluid communication with a second chamber of the hydraulic actuator.

The actuator control valve may comprise a service port in fluid communication with the service network. The actuator control valve may comprise a return port in fluid communication with the return network.

The actuator control valve may be configurable to a closed configuration. In the closed configuration, the first actuator port may be blocked from fluid communication with the service port and/or return port. In the closed configuration, the second actuator port may be blocked from fluid communication with the service port and/or return port.

The actuator control valve may be configurable to a first actuation configuration. In the first actuation configuration, the first actuator port may be in fluid communication with the service port. In the first actuation configuration, the second actuator port may be in fluid communication with the return port.

The actuator control valve may be configurable to a reversed first actuation configuration. In the reversed first actuation configuration, the first actuator port may be in fluid communication with the return port. In the reversed first actuation configuration, the second actuator port may be in fluid communication with the service port.

The direction of the force applied by the actuator, i.e. whether the actuator is driven to extend or retract, may depend on whether or not the actuator control valve is in a reversed configuration.

The hydraulic system may be configured to, in use, control the hydraulic actuator to drive a load by:

- the controller controlling at least one of the piston switching valves to adopt the third (e.g. storage) configuration during an in-stroke of the associated piston, such that pressurised hydraulic fluid from the storage network is received into the cylinder of said piston, thereby exerting a force on said piston and contributing to the kinetic energy of the piston drive element; and
- the controller controlling at least one of the piston switching valves to adopt a first (e.g. service) configuration during an out-stroke of the associated piston such that, in use, hydraulic fluid present in the associated cylinder is expelled into the service network, thereby causing the hydraulic actuator to drive the load using energy received from the energy storage device.

The hydraulic system may be configured to, in use, transfer energy from a load acting on the actuator to the energy storage device by:

the controller controlling at least one of the piston switching valves to adopt the first (e.g. service) configuration during an in-stroke of the associated piston, such that, as the hydraulic actuator is driven by the load, pressurised hydraulic fluid in the service network is received into the cylinder of said piston, thereby exerting a force on said piston and contributing to the kinetic energy of the piston drive element; and the controller controlling at least one of the piston switching valves to adopt a third (e.g. storage) configuration during an out-stroke of the associated piston such that, in use, hydraulic fluid present in the associated cylinder is expelled into the storage network, thereby causing the energy storage device to store energy received from the load.

The hydraulic system may comprise one or more force transducers (e.g. pressure transducers) to determine a direction of the force applied by the load. Alternatively or additionally, the direction of the force applied by the load may be determined on the basis of an error between a measured value (e.g. the actuator position) and the demand. The controller may be configured to cause the hydraulic system to store (recover, harvest) energy from the load if the load acts in the same direction as the desired movement of the actuator.

The storage network may comprise a flow channel for taking fluid from the energy storage device to the piston switching valve arrangement (e.g. to the storage port of each piston switching valve). Said flow channel may follow a flow path which travels via a controllable valve. The controllable valve may be configured to selectively permit and prevent fluid flow from the energy storage device to the piston switching valve assembly. The controllable valve may be a spool valve. The controllable valve may be the actuator control valve.

It may be that in the closed configuration of the actuator control valve, fluid flow from the energy storage device to the piston switching valve arrangement is blocked or be restricted by a flow restrictor. Therefore it may be that the pistons do not receive pressurised hydraulic fluid from the energy storage device when the hydraulic actuator is not required to move.

It may be that in the first actuation configuration (and the reversed first actuation configuration) of the actuator control valve, the actuator control valve provides a flow path for fluid flow from the energy storage device to the piston switching valve arrangement. Therefore, when it is required to pump fluid to the hydraulic actuator, one or more of the pistons can be opened to hydraulic fluid pressurised by the energy storage device during their in-stroke, and the hydraulic device can thereby at least in part be driven by the energy stored in the energy storage device.

The storage network may comprise a flow channel for taking fluid from the piston switching valve arrangement to the energy storage device. Said flow channel may comprise a one-way valve. The one-way valve may be configured to permit fluid flow from the piston switching valve arrangement to the energy storage device; and to block fluid flow from the energy storage device to the piston switching valve arrangement. The hydraulic device may charge the energy storage device via said flow channel, even if the actuator control valve is in the closed configuration.

The hydraulic system may comprise a flow channel for connecting the storage network and the service network via a controllable valve. The controllable valve may selectively permit and prevent fluid communication between the storage network and the service network. Permitting fluid flow directly from the storage network to the service network may allow the hydraulic actuator to receive high pressure fluid directly from the energy storage device. This may be useful when there are high power demands on the hydraulic actuator, for example when it is necessarily to move the hydraulic actuator very quickly. The controller may be configured to control the controllable valve to put the storage network and the service network in fluid communication when the demand exceeds a threshold value.

The controllable valve for connecting the storage network and the service network may be a proportional control valve. The controllable valve may be a spool valve. The controller may be configured to control the position of the controllable valve to provide proportional control of the hydraulic actuator. The controller may be configured to control the flow rate from the storage network to the service network by adjusting the size of an orifice through which the fluid flows in the controllable valve.

The controllable valve for connecting the storage network and the service network may be the actuator control valve. It may be that in the closed configuration and the first actuation configuration (and the reverse first actuation configuration) of the actuator control valve, fluid flow between the storage network and the service network is blocked.

It may be that in a second actuation configuration (e.g. a high demand configuration) of the actuator control valve, the fluid connections are the same as the first actuation configuration of the actuator control valve, except that fluid flow from the storage network to the service network may be permitted. It maybe that in a reversed second actuation configuration of the actuator control valve, the fluid connections are the same as the reversed first actuation configuration of the actuator control valve, except that fluid flow from the storage network to the service network may be permitted. It may be that in the second actuation configuration (and reversed second actuation configuration) of the actuator control valve, the actuator control valve provides proportional control of the hydraulic actuator.

The hydraulic system may further comprise a secondary energy storage device. The secondary energy storage device may be an accumulator (e.g. a secondary accumulator). The accumulator may be a gas-charged accumulator. The secondary energy storage device may pressurise hydraulic fluid to a maximum pressure lower than that of the aforementioned (primary) energy storage device. The secondary energy storage device and the service network may be connectable via a controllable valve. The controllable valve may selectively permit and prevent fluid communication between the secondary energy storage device and the service network.

The controllable valve for connecting the secondary energy storage device and the service network may be a proportional control valve. The controllable valve may be a spool valve. The controller may be configured to control the position of the controllable valve to provide proportional control of the hydraulic actuator. The controller may be configured to control the flow rate from the secondary energy storage device to the service network by adjusting the size of an orifice through which the fluid flows in the controllable valve.

The controllable valve for connecting the secondary energy storage device and the service network may be the actuator control valve. It may be that in the closed configuration of the actuator control valve, fluid flow between the secondary energy storage device and the service network is permitted. This may allow the secondary energy storage device to be charged, and also to maintain a pressure in the service network, even when the actuator is not required to be moved. It may be that in the first actuation configuration (and the reverse first actuation configuration), fluid flow between the secondary energy storage device and the service network is blocked. It may be that in the second actuation configuration (and the reversed second actuation configuration) of the actuator control valve, fluid flow between the secondary energy storage device and the service network is blocked.

It may be that in a third actuation configuration (e.g. a low demand configuration) of the actuator control valve, the fluid connections are the same as the first actuation configuration of the actuator control valve, except that fluid flow from the secondary energy storage device to the service network may be permitted. It may be that in a reversed third actuation configuration of the actuator control valve, the fluid connections are the same as the reversed first actuation configuration of the actuator control valve, except that fluid flow from the secondary energy storage device to the service network may be permitted. It may be that in the third actuation configuration (and the reversed third actuation configuration) of the actuator control valve, the actuator control valve provides proportional control of the hydraulic actuator.

In some embodiments, the controller is configured to only change the configuration of a piston switching valve at the beginning of a stroke. In such embodiments, the minimum amount of fluid the hydraulic device can add to the hydraulic actuator chamber is equal to the volume of one cylinder. This may limit the ability of the actuator to carry out fine movements. Furthermore, it may only be practical to slow the rotation speed of the drive element down a certain amount, therefore the minimum speed at which said minimum amount of fluid is pumped to the actuator may still be relatively fast. Providing proportional control of the actuator using the second, lower pressure, energy storage device may help overcome these difficulties. The hydraulic actuator may be subject to proportional control using pressure from the secondary energy storage device when the position adjustment required is below a threshold distance and/or below a threshold speed.

In embodiments in which the actuator control valve is a linear spool valve, the spool and the manifold may comprise a first region and a second region. The first region may be for controlling the fluid connection between the service network, the return network, and the hydraulic actuator. The second region may be for controlling one or more of: the fluid connection between the energy storage device and the storage network, the fluid connection between the storage network and the service network, and/or the fluid connection between the secondary energy storage device and the service network.

The hydraulic system may comprise a flow channel configured to bring hydraulic fluid from the service network and/or return network to the motor for lubrication of the motor (e.g. lubrication of the motor bearings). The hydraulic system may comprise a first flow channel from the service network to the motor, and a second flow channel from the motor to the return network. Said flow channels may flow via the actuator control valve.

The hydraulic system may comprise one or more sensors for determining one or more of: the hydraulic reservoir level, the accumulator level, the secondary accumulator level, the velocity of the drive element, the velocity of the motor for the drive element, the position of the actuator, the pressure in the first chamber of the hydraulic actuator, the pressure in the second chamber of the hydraulic actuator, the pressure in the storage network, the pressure in the service network, the pressure in the return network.

The present disclosure provides, according to a third aspect, a hydraulic system for controlling a hydraulic actuator, the hydraulic system comprising: an actuator control valve for controlling a flow of hydraulic fluid to the hydraulic actuator, the actuator control valve comprising a first actuator port for fluid communication with a first chamber of the hydraulic actuator and a service port; a service network comprising one or more fluid flow channels in fluid communication with a hydraulic pump and with the service port of the actuator control valve; a storage network for connecting to an energy storage device (e.g. an accumulator); and a flow channel for connecting the storage network and the service network via the actuator control valve The actuator control valve is configurable to a first actuation configuration in which the first actuator port is fluid communication with the service port, and fluid flow between the storage network and the service network is blocked, such that the actuator control valve allows, in use, the hydraulic actuator to be controlled using the hydraulic pump.

The actuator control valve is configurable to a second actuation configuration in which the first actuator port is fluid communication with the service port, fluid flow from the storage network to the service network is permitted, and wherein the actuator control valve is configured to provide, in use, proportional control of the hydraulic actuator using hydraulic pressure provided by the energy storage device.

The hydraulic system may comprise a flow channel for connecting a secondary energy storage device (e.g. accumulator) and the service network via the actuator control valve. It may be that in the first and second actuation configuration, fluid flow between the secondary energy storage device and the service network is blocked.

The actuator control valve may be configurable to a third actuation configuration in which the first actuator port is fluid communication with the service port, fluid flow between the storage network and the service network is blocked, and fluid flow between the secondary energy storage device and the service network is permitted, wherein the actuator control valve is configured to provide, in use, proportional control of the hydraulic actuator using hydraulic pressure provided by the secondary energy storage device.

The hydraulic system according to the third aspect of the disclosure may comprise any of the features set out above in relation to the first or second aspect of the disclosure.

The present disclosure provides, according to a fourth aspect, an actuator control valve for controlling a hydraulic actuator. The actuator control valve comprises: a first actuator port for connecting to a first chamber of the hydraulic actuator; a service port for connecting to a service network in fluid communication with a hydraulic pump; a further service port for connecting to the service network; and a storage port for connecting to a storage network in fluid communication with an energy storage device.

The actuator control valve is configurable to a first actuation configuration in which the first actuator port is in fluid communication with the service port, and fluid flow between the further service port and the storage port is blocked, such that the actuator control valve allows, in use, the hydraulic actuator to be controlled using the hydraulic pump.

The actuator control valve is configurable to a second actuation configuration in which the first actuator port is fluid communication with the service port, fluid flow from the further service port to the storage port is permitted, and wherein the actuator control valve is configured to provide, in use, proportional control of the hydraulic actuator using hydraulic pressure provided by the energy storage device.

The actuator control valve may further comprise a secondary energy storage device port for connecting to a secondary energy storage device.

The actuator control valve may be configurable to a third actuation configuration in which the first actuator port is in fluid communication with the service port, fluid flow between the further service port and the storage port is blocked, fluid flow from the secondary energy storage device port to the further storage port permitted, and wherein the actuator control valve is configured to provide, in use, proportional control of the hydraulic actuator using hydraulic pressure provided by the secondary energy storage device.

The actuator control valve may further comprise a second actuator port for connection to a second chamber of the hydraulic actuator. The actuator control valve may further comprise a return port for connection to a return network. It may be that in the first, second and third actuation configurations of the actuator control valve, the second actuator port is in fluid communication with the return port.

The actuator control valve may be configurable to a reversed first, second and/or third configuration, wherein the first actuator port is in fluid communication with the return port, and the second actuator port is in fluid communication with the service port.

The actuator control valve may be configurable to a closed configuration in which fluid flow to the first and/or second actuator control ports is blocked. The actuator control valve according to the fourth aspect of the disclosure may additionally comprise any of the features set out above in relation to the first, second or third aspects of the disclosure.

The present disclosure provides, according to a fifth aspect, a hydraulic actuation system. The hydraulic actuation system comprises a hydraulic actuator and a hydraulic system according to the second or third aspect of the disclosure. The hydraulic actuator is connected to the actuator control valve such that the actuator control valve controls the flow of hydraulic fluid to the hydraulic actuator. The actuator control valve may be in accordance with the fourth aspect of the disclosure.

The hydraulic actuator may be a single acting hydraulic actuator. Thus, the hydraulic actuator may comprise a first chamber connected to the first actuator port of the actuator control valve.

The hydraulic actuator may be a double acting hydraulic actuator. Thus, the hydraulic actuator may comprise a first chamber and a second chamber separated by a piston. The first chamber may be connected to the first actuator port of the actuator control valve, and the second chamber may be connected to the second actuator port of the actuator control valve.

The present disclosure provides, according to a sixth aspect, a flight control system for an aircraft. The flight control system comprises a flight control surface and a hydraulic actuation system according to the fourth aspect of the disclosure. The position of the flight control surface is controlled by the hydraulic actuator. The flight control surface may be any one of: an aileron, rudder, elevator, leading edge slat, spoiler or air brake. The aircraft may be a fixed-wing aircraft.

The present disclosure provides, according to a further aspect, a method of using a hydraulic device in a hydraulic system. The hydraulic device may be a hydraulic device according to any preceding aspect of the disclosure. The method may comprise one or more of: driving the rotatable piston drive element to reciprocate the pistons, using the piston switching valves to control fluid flow into and out of the cylinders, and using the controller to control the configuration of the piston switching valves.

The present disclosure provides, according to a further aspect, a method of controlling a hydraulic actuator. The method may comprise controlling the hydraulic actuator using a hydraulic device according to any preceding aspect of the disclosure. The hydraulic actuator may form part of a hydraulic system according to any preceding aspect. The method may comprise a step of transferring energy from a load acting on the hydraulic actuator to an energy storage device. The method may comprise a step of causing the hydraulic actuator to drive the load using energy received from the energy storage device.

It will of course be appreciated that features described in relation to one aspect of the present disclosure may be incorporated into other aspects of the present disclosure. For example, the method of the disclosure may incorporate any of the features described with reference to the apparatus of the disclosure and vice versa.

BRIEF DESCRIPTION OF THE DRAWINGS

Embodiments of the present disclosure will now be described by way of example only with reference to the accompanying schematic drawings of which.

DETAILED DESCRIPTION

Figure 1:
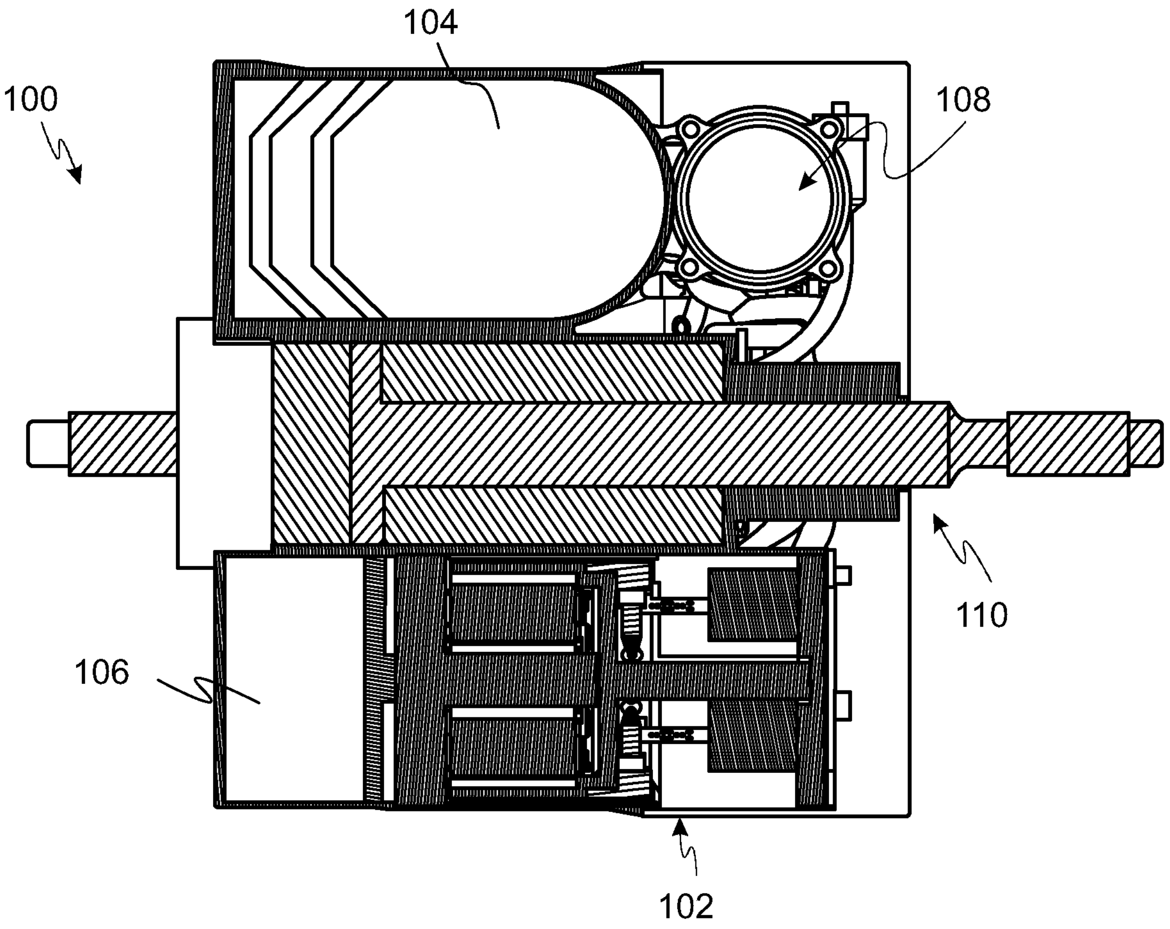
FIG. 1 shows a cross-sectional view of a hydraulic actuation system according to a first embodiment of the disclosure.

FIG. 1 shows a hydraulic actuation system 100 according to a first embodiment of the disclosure. The hydraulic actuation system 100 comprises a hydraulic pump/motor 102, an energy storage device in the form of an accumulator 104, a hydraulic reservoir in the form of a bootstrap reservoir 106, an actuator control valve 108, and a dual-acting hydraulic actuator 110.

Figure 2:
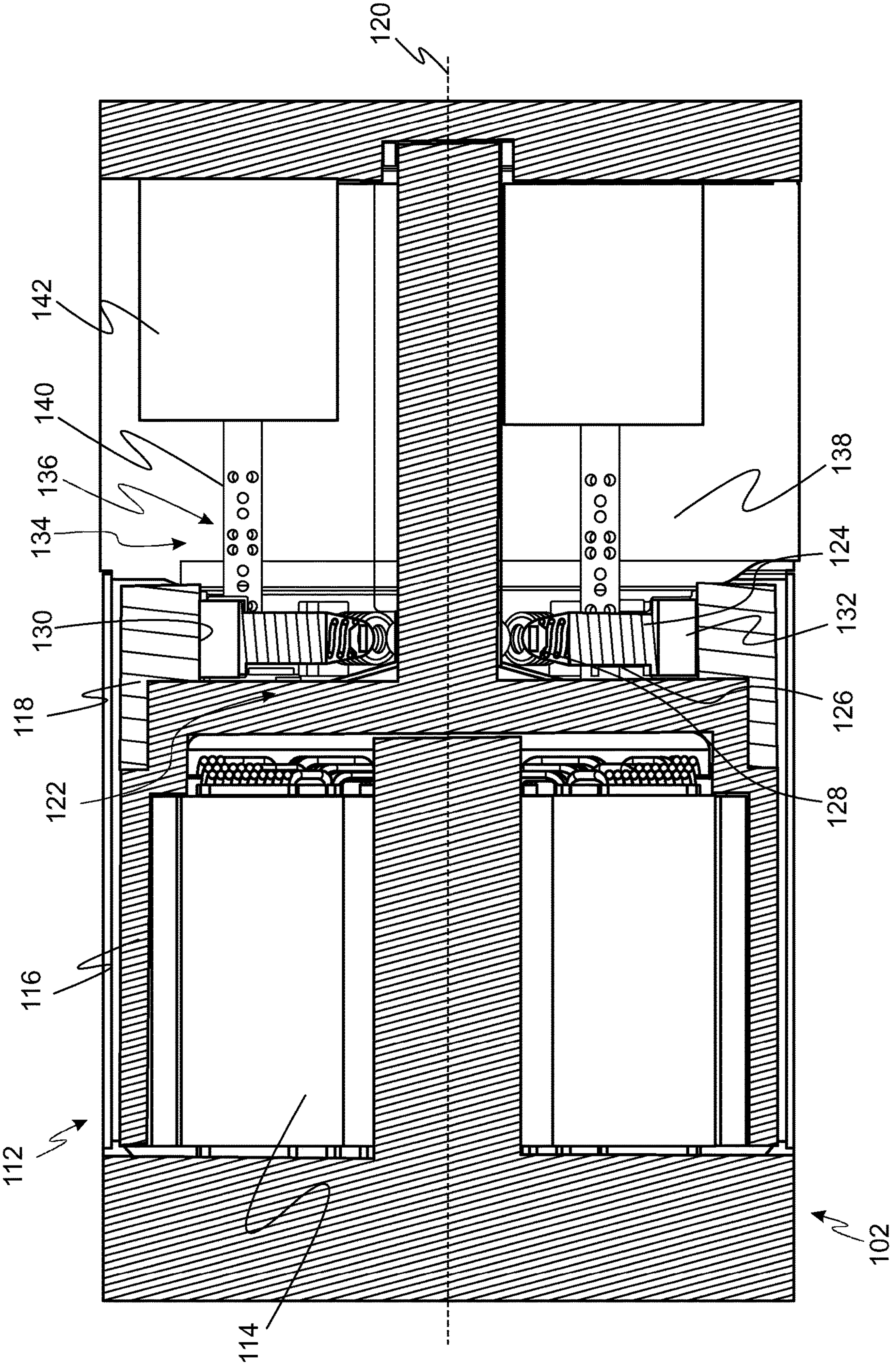
FIG. 2 shows a cross-sectional view of a hydraulic pump/motor of the hydraulic actuation system.

FIG. 2 shows the hydraulic pump/motor 102 in more detail. The hydraulic pump/motor 102 comprises an outer rotor electric motor 112 comprising a stator 114, comprising a plurality of stator coils, and a rotor 116, comprising a plurality of permanent magnets, provided around the outside of the stator 114. The rotor 116 is attached in a fixed relation to drive element in the form of a ring cam 118. The ring cam 118 is therefore directly driven by the motor 112. The rotor 116 and the ring cam 118 share the same axis of rotation 120.

The ring cam 118 surrounds a piston arrangement 122. The piston arrangement 122 comprises a plurality of pistons 124, each piston 124 being arranged to reciprocate within a cylinder 126 in a cycle comprising an in-stroke wherein fluid flows into the cylinder 126 and an out-stroke wherein fluid flows out of the cylinder 126. In this embodiment, the piston arrangement 122 comprises twelve pistons 124. Alternative embodiments may comprise more or fewer pistons.

The pistons 124 and cylinders 126 are provided in a radial arrangement in a single plane which is perpendicular to the axis of rotation 120 of the ring cam 118. Each piston 124 and cylinder 126 extends radially away from the axis of rotation 120, and each piston 124 reciprocates along an axis of reciprocation which extends in a radial direction. The hydraulic pump/motor 102 may therefore be referred to as a radial piston pump/motor. Furthermore, it can be said that the piston arrangement 122 is in an internally impinged arrangement.

Each piston 124 is resiliently urged outwards and towards the ring cam 118 by a resilient bias in the form of a spring 128 disposed in the cylinder 126. The ring cam 118 comprises an inner surface which provides a cam surface 130. The pistons each comprise a roller 132 which engages the cam surface 130.

Figure 3:
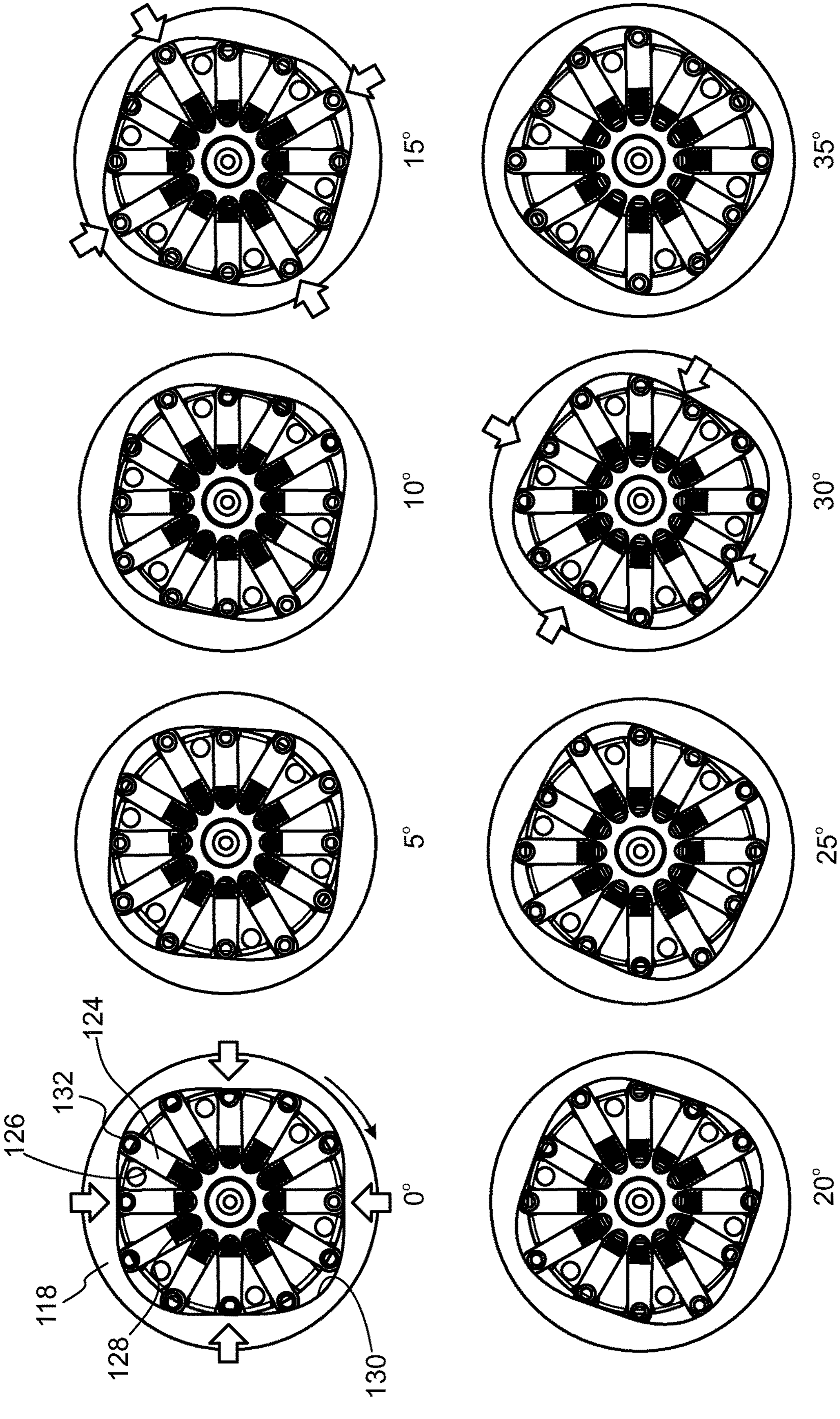
FIG. 3 shows cross sectional views of a piston arrangement and a ring cam of the hydraulic pump/motor, the views showing the ring cam rotating clockwise in five degree increments.

FIG. 3 shows the piston arrangement 122 in cross section, the cross section being taken along the plane perpendicular to the axis of rotation 120. The radial arrangement of the pistons 124 and the shape of the cam surface 130 of the ring cam 118 can be seen in FIG. 3. The cam surface 130 comprises four regions of greater radius (where the ring cam 118 is thinnest), and four regions of smaller radius (where the ring cam 118 is thickest). As the ring cam 118 rotates, the pistons 124 are collectively driven to reciprocate within their respective cylinders 126 by camming engagement of the rollers 132 against the cam surface 130.

FIG. 3 shows the ring cam 118 in eight different positions relative to the piston arrangement 122, the positions being five degrees of rotation apart from each other. Over any given revolution of the ring cam 118, each piston 124 completes four cycles comprising an in-stroke and out-stroke.

The cam surface 130 is shaped such that the reciprocation of each piston 124 comprises a period of dwell between each in-stroke and out-stroke. During the period of dwell, the piston 124 is substantially stationary.

The hydraulic pump/motor 102 further comprises a piston switching valve arrangement 134 comprising a plurality of piston switching valves 136. In this embodiment, the piston switching valve arrangement 134 comprises six piston switching valves 136. The pistons 124 are paired up, and the pistons 124 within each pair are associated with the same piston switching valve 136. Each of the individual pairs are associated with a different piston switching valve 136, such that each piston switching valve 136 only serves two pistons 124. In this embodiment, the pistons 124 which are arranged diametrically opposite to each other from a pair. The diametrically opposite pistons 124 reciprocate in-phase.

The piston switching valves 136 are located within a switching valve manifold 138. The cylinders 126 are in fluid communication with the pistons switching valves 136 via flow channels within the switching valve manifold 138. The flow channels are not shown in FIG. 2. The switching valve manifold 138 is formed by an additive manufacturing process. This may allow the flow channels to be tightly packed within the switching valve manifold 138.

Each piston switching valve 136 is a rotary spool valve comprising a cylindrical rotary spool 140 which is arranged to rotate in a correspondingly shaped recess in the switching valve manifold 138. Rotation of the spool 140 is driven by an electric motor 142. There is one electric motor 142 per spool 140, such that the rotational position of each spool 140 can be individually controlled. An angular position sensor (not shown) senses the angular position of each motor 142, and thus each spool 140. Each motor 142 and its associated spool 140 both share the same axis of rotation.

Figure 4:
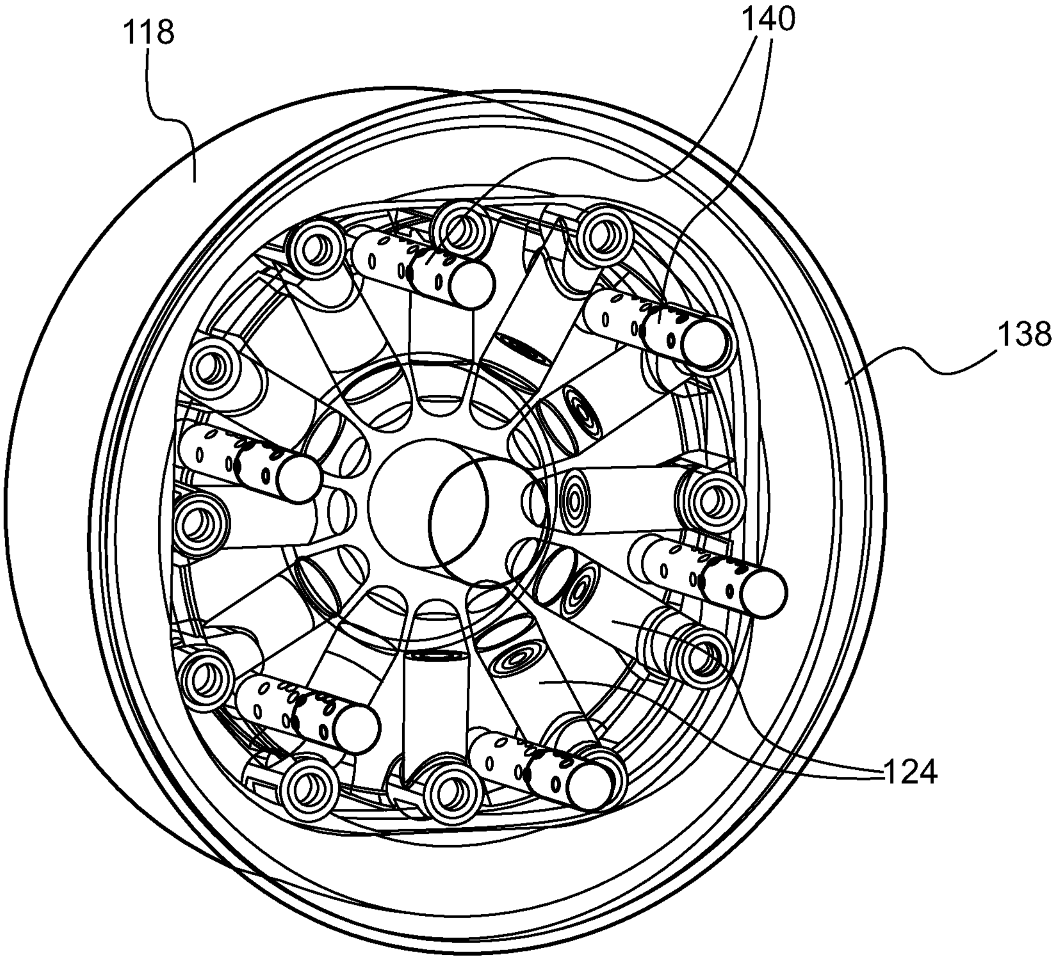
FIG. 4 shows a perspective view of the piston arrangement, the ring cam and piston switching valves of the hydraulic pump/motor.

FIG. 4 shows the position of the spools 140 relative to the pistons 124. As can be seen, the spools 140 extend perpendicular to the pistons 124, and parallel to the axis of rotation 120 of the ring cam 118. The spools 140 also overlap with the plane containing the pistons, which saves space within the device.

Figure 5:
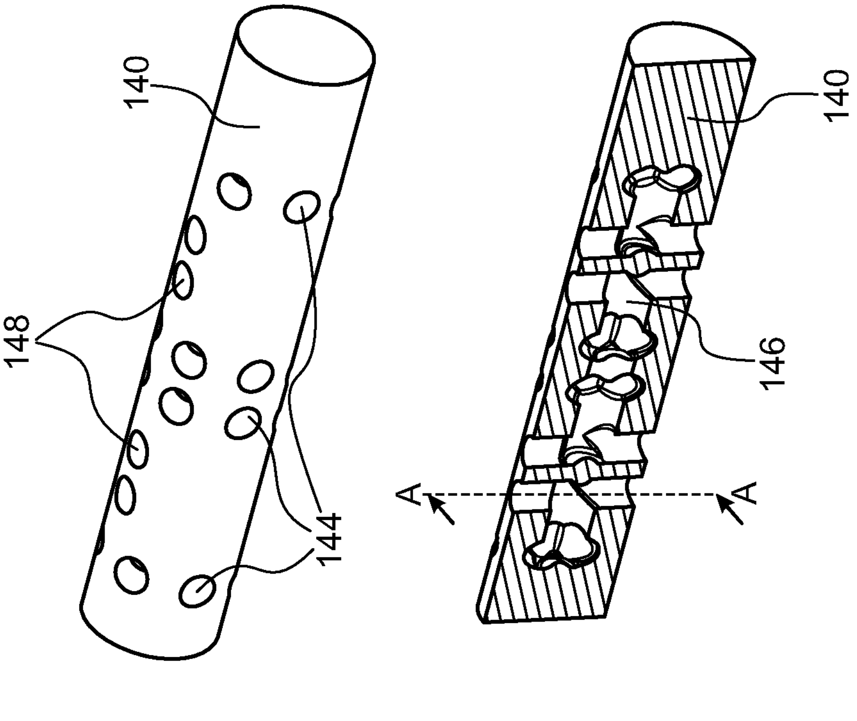
FIG. 5 shows a perspective view and a lengthways cross-sectional view of a spool of a piston switching valve of the hydraulic pump/motor.

FIG. 5 shows one of the spools 140, both from the outside and in cross section. The spool 140 comprises three longitudinal regions which align with three cylinder ports (not shown) in the switching valve manifold 138. The cylinder ports directly connect to fluid flow channels which convey fluid to and from the cylinders 126. The three longitudinal regions comprise apertures 144 into which fluid can flow into internal regions 146 of the spool 140. The spool 140 comprises two further longitudinal regions comprising apertures 148 in fluid communication with the internal regions 146 of the spool 140. Thus the spool 140 comprises internal fluid flow paths which connect the apertures 144 with the apertures 148.

Figure 6:
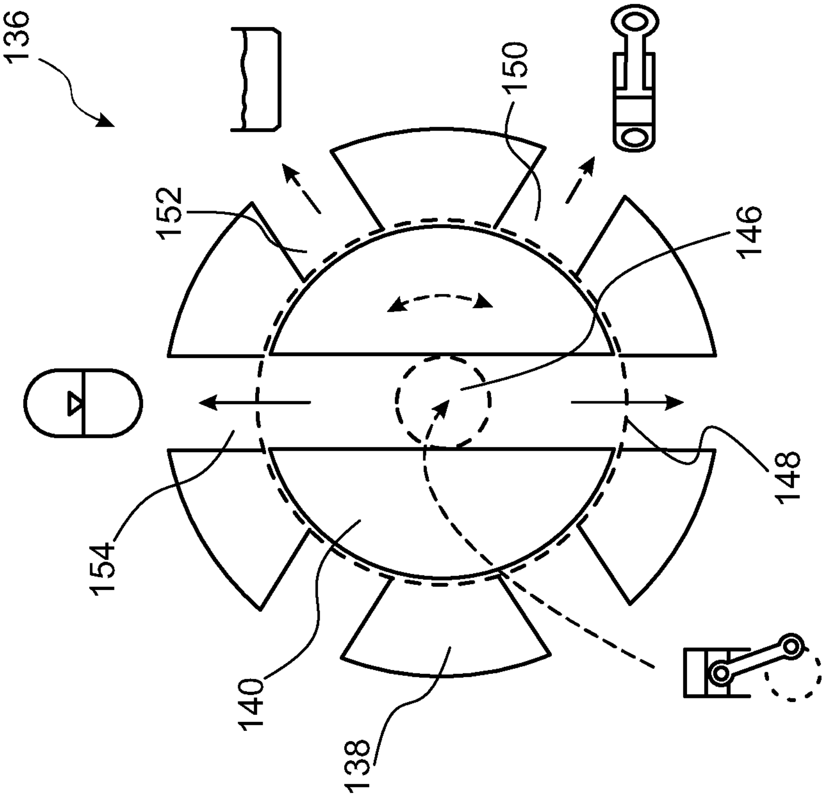
FIG. 6 shows a schematic widthways cross sectional view of the spool of the piston switching valve of the hydraulic pump/motor, taken along the line A-A.

As shown in FIG. 6, by rotating the spool 140 relative to the switching valve manifold 138, the apertures 148 can be aligned with either a service port 150 which opens to a service network, a return port 152 which opens to a return network, or a storage port 154 which opens to a storage network. The three positions of the spool 140 relative to the switching valve manifold 138 define a service configuration, a return configuration and a storage configuration, respectively, of the piston switching valve 136.

The hydraulic pump/motor 102 further comprises a controller (not shown). The controller is configured to control the motors 142 to adjust the configuration of each piston switching valve 136 at the beginning of the in-stroke and the out-stroke of the associated piston 124. In the embodiment shown, the controller is configured to determine, each fifteen degrees of rotation of the ring cam 118, which configuration should be adopted by the piston switching valve 136 associated with the next piston 124 to begin an in-stroke or an out-stroke. The determination is made on the basis of a demand of the hydraulic actuator 110 and the direction of the load acting on the hydraulic actuator 110.

For example, and with reference to FIG. 3, the controller determines at the zero degree position of the ring cam 118, which configuration should be adopted by the piston switching valves 136 associated with the pistons at the 3 o'clock, 6 o'clock, 9 o'clock and 12 o'clock positions. The controller then determines at the 15 degree position of the ring cam 118, which configuration should be adopted by the piston switching valves 136 associated with the pistons at the 2 o'clock, 5 o'clock, 8 o'clock and 11 o'clock positions. The controller then determines at the thirty degree position of the ring cam 118, which configuration should be adopted by the piston switching valves 136 associated with the pistons at the 1 o'clock, 4 o'clock, 7 o'clock and 10 o'clock positions, and so on.

Once a determination has been made, the controller controls the motors 142 to rotate (or not) their respective spool 140 in order achieve the desired configuration of the piston switching valves 136.

Figure 7:
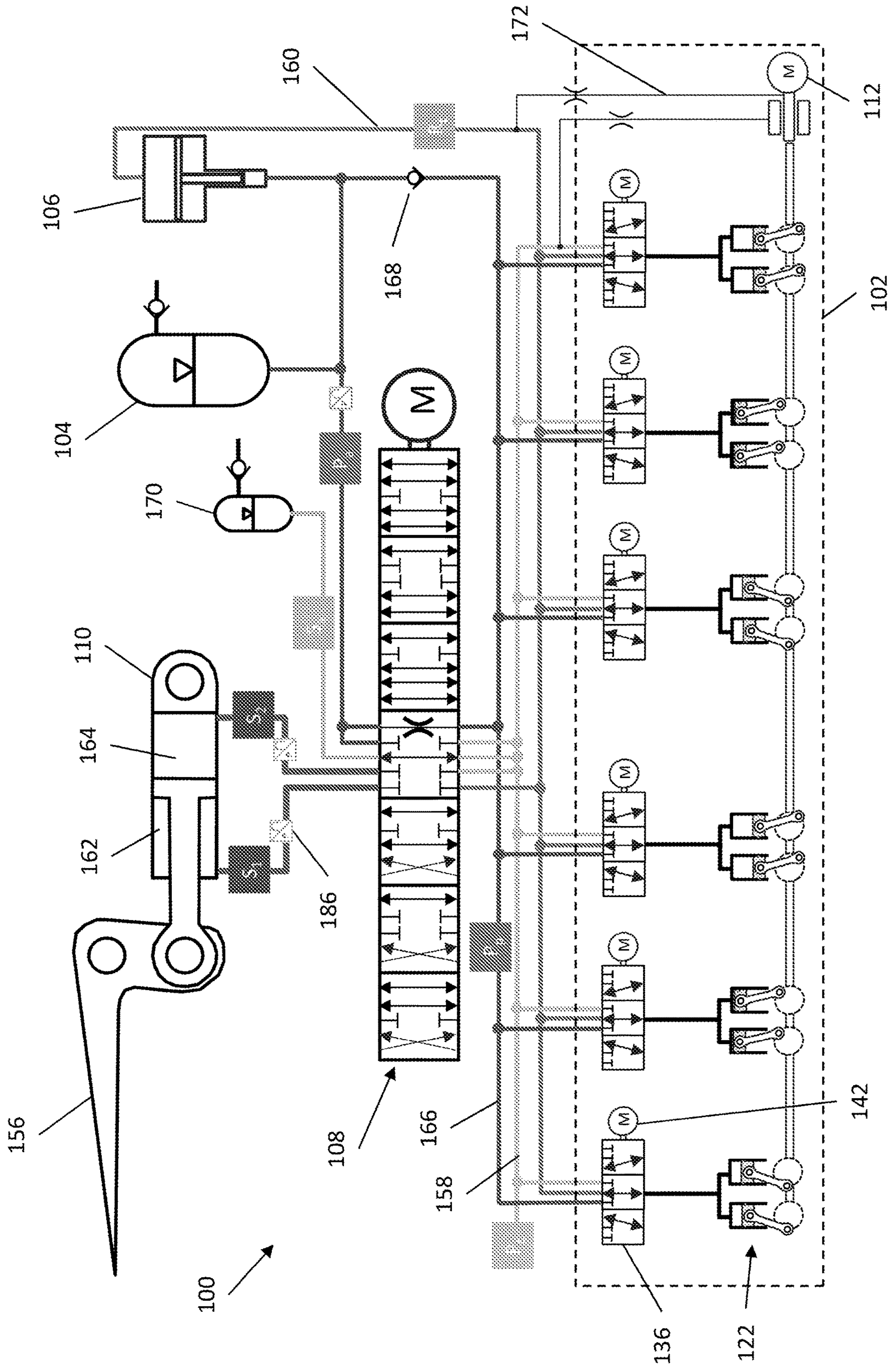
FIG. 7 shows a schematic of the hydraulic connections within the hydraulic actuation system.

FIG. 7 shows a schematic of the hydraulic connections within the hydraulic actuation system 100. In FIG. 7, the hydraulic actuator 110 is shown controlling a flight control surface 156. Therefore the arrangement may be regarded as a flight control system.

The service network 158 (also denoted $P_s$) connects the service ports of the piston switching valves 136 to a service port of the actuator control valve 108. The return network 160 (also denoted $R_t$) connects the return ports of the piston switching valves 136 to a return port of the actuator control valve 108, and to the bootstrap reservoir 106.

The bootstrap reservoir 106 comprises a piston having a first face with a higher surface area and a second face with a lower surface area. The first face is exposed to the hydraulic fluid stored within the reservoir 106. The second face is exposed to the hydraulic fluid in the storage network 166 which is pressurised by the accumulator 104. As a result, the first face of the piston pushes against the hydraulic fluid stored within the reservoir 106 and thereby slightly pressurises the fluid in the return network 160.

The actuator control valve 108 comprises a first actuator port connected to a first chamber 162 of the hydraulic actuator 102, and a second actuator port connected to a second chamber 164 of the hydraulic reservoir 102. The first chamber 162 and second chamber 164 are separated by a piston which is connected to the flight control surface 156.

The storage network 166 (also denoted $P_P$ and $P_a$) connects the storage ports of the piston switching valves 136 to the accumulator 104. The accumulator 104 is a gas-charged accumulator. The storage network 166 comprises a flow channel arranged to take fluid from the piston switching valves 136 to the accumulator 104. The flow channel comprises a one-way valve 168, such that the hydraulic pump/motor 102 may pump fluid to, and therefore charge, the accumulator 104; however, fluid cannot flow through the flow channel in the opposite direction.

The storage network 116 further comprises a flow channel arranged to take fluid from the accumulator 104 to the piston switching valves 136. The flow channel flows via the actuator control valve 108.

The hydraulic actuation system 100 further comprises a flow channel arranged to connect the storage network 166 to the service network 158 via the actuator control valve 108. Connecting the storage network 166 to the service network 158 can allow the high pressure fluid output from the accumulator 104 to act directly on the hydraulic actuator 110, which may be advantageous during high power demands of the hydraulic actuator 110. Such a flow channel effectively bypasses the hydraulic pump/motor 102.

The hydraulic actuation system 100 further comprises a secondary energy storage device in the form of a gas-charged accumulator 170, which will hereinafter be referred to a secondary accumulator 170. The secondary accumulator 170 has a lower working pressure than the accumulator 104. The hydraulic actuation system 100 comprises a flow channel (Sa) arranged to connect the secondary accumulator 170 to the service network 158 via the actuator control valve 108.

The hydraulic actuation system 100 further comprises a pair of flow channels 172 arranged to take fluid from the service network 158 to the motor 112 for lubrication of the motor bearings, and back to the return network 160. The flow channels 172 comprise flow restrictors to prevent high pressure flow through the motor 112.

FIGS. 8 to 11 show cross sections through the actuator control valve 108. The actuator control valve 108 is a linear spool valve comprising a linear spool 174 which moves relative to a manifold 176. The spool 174 is actuated by an electric motor 178 via a crank mechanism 180 which converts rotational motion of the motor 178 into linear motion of the spool 174

The actuator control valve 108 is configurable between seven configurations. The configuration adopted by the actuator control valve 108 at any given time is dictated by the linear position of the spool 174 relative to the manifold 176.

Figure 8:
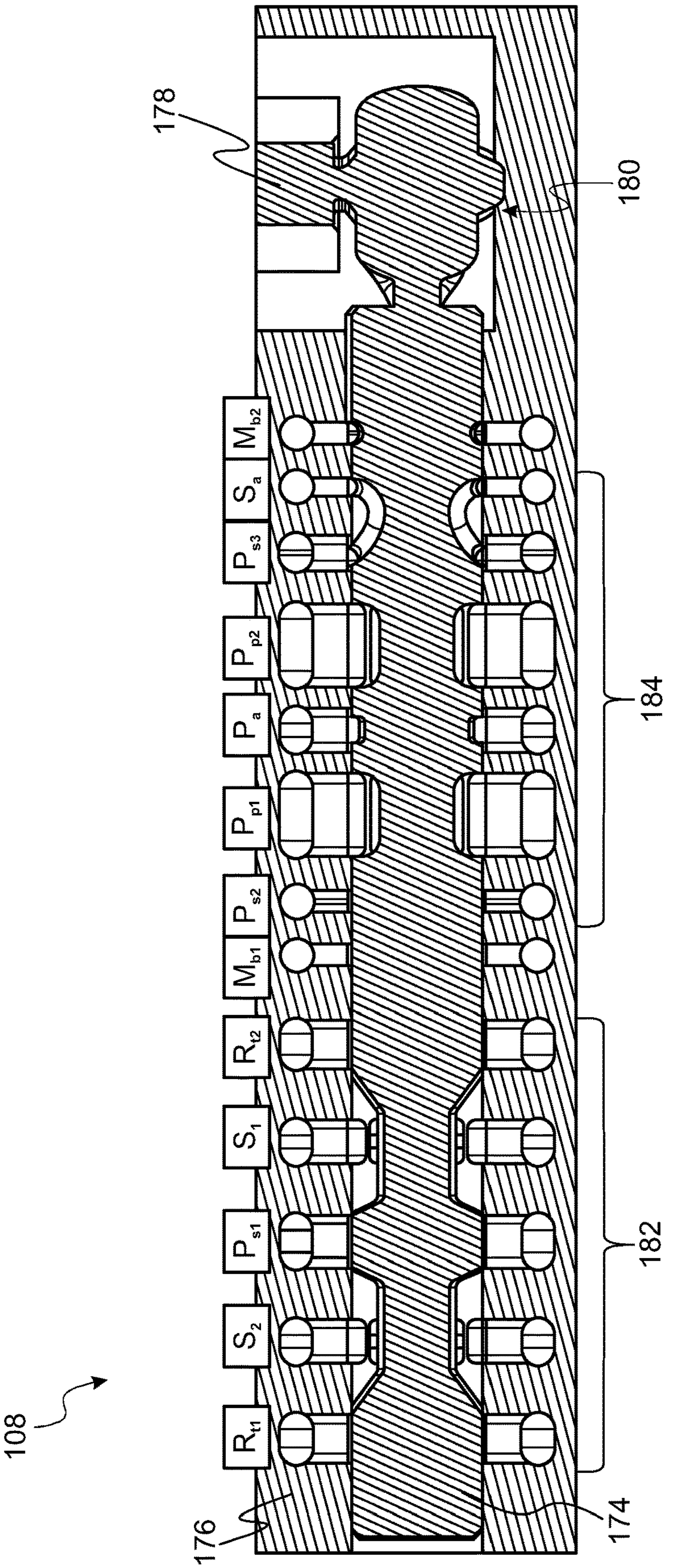
FIG. 8 shows a cross section through an actuator control valve of the hydraulic actuation system, the actuator control valve being in a centered configuration.
Figure 9:
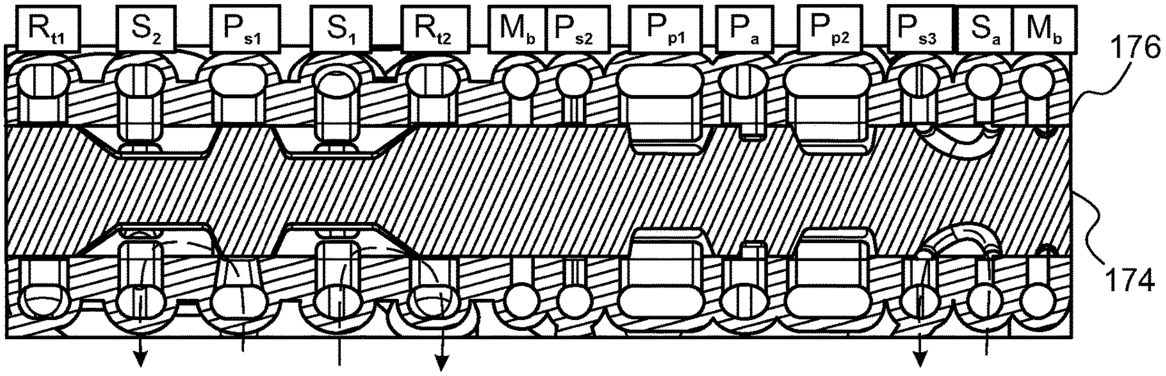
FIG. 9 shows a cross section through an actuator control valve of the hydraulic actuation system, the actuator control valve being in first actuation configuration.
Figure 10:
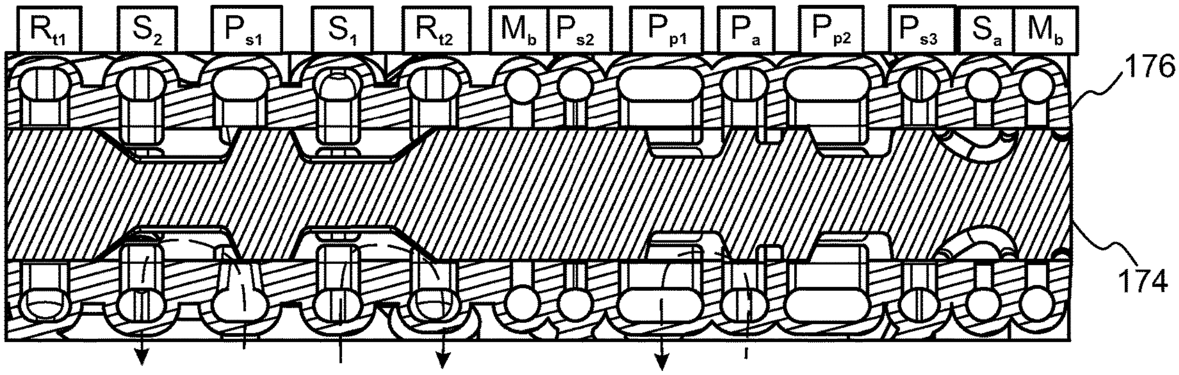
FIG. 10 shows a cross section through an actuator control valve of the hydraulic actuation system, the actuator control valve being in a second actuation configuration.
Figure 11:
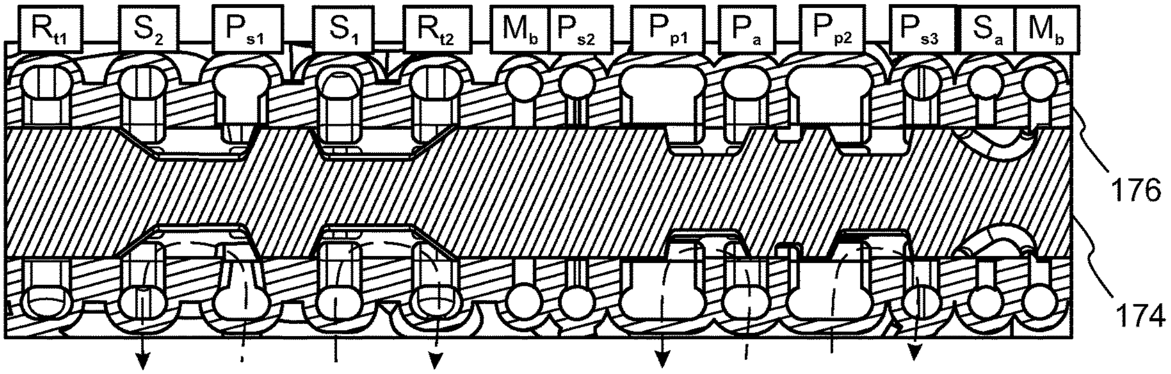
FIG. 11 shows a cross section through an actuator control valve of the hydraulic actuation system, the actuator control valve being in a third actuation configuration.

FIG. 8 shows the actuator control valve 108 in a centered and closed configuration; FIG. 9 shows the actuator control valve 108 in actuation configuration one in which the spool 174 has been moved (in the orientation shown) to the right relative to the manifold 176. FIG. 10 shows the actuator control valve 108 in actuation configuration two in which the spool 174 has been moved further to the right. FIG. 11 shows the actuator control valve 108 in actuation configuration three in which the spool 174 has been moved further still to the right. Reversed actuation configurations one, two and three can be adopted by moving the spool 174 a corresponding amount in the opposite direction (to the left in the orientation shown).

The labels "one", "two" and "three" correspond, respectively, to the "third", "second" and "first" actuation configurations described in the "Summary" section above. The configurations are labelled numerically for convenience only, and the precise number attributed to each configuration is not important.

The spool 174 and manifold 176 comprise two regions. A first region 182 controls the connection between the service network 158, the return network 160, and the first chamber 162 and the second chamber 164 of the hydraulic actuator 110.

The first region 182 is centered upon a service port ($P_s$) in the manifold which is connected to the service network 158. To either side of the service port ($P_s$) is a first actuator port ($S_1$) connected to an actuator control line connected to the first chamber 162 of the hydraulic actuator 110 and a second actuator port ($S_2$) connected an actuator control line connected to the second chamber 164 of the hydraulic actuator 110. To either side of the actuator ports ($S_1$, $S_2$) are return ports ($R_{t1}$, $R_{t2}$) connected to the return network 160.

In the first region 182, the spool 174 comprises lands which, in the centered and closed configuration of the actuator control valve 108 (FIG. 8), block the service port ($P_s$) and return ports ($R_{t1}$, $R_{t2}$). When the spool 174 is displaced away from the central position (FIGS. 9 to 11), the first and second actuator control ports ($S_1$, $S_2$) are respectively put in fluid communication, via recesses in the spool 174, with either the service port ($P_s$) and thus the service network 158 or a return port ($R_{t1}$, $R_{t2}$) and thus the return network 160, depending on the direction which the spool 174 is displaced.

A second region 184 controls the connection between the accumulator 104 and the storage network 166, the connection between the storage network 166 and the service network 158, and the connection between the secondary accumulator 170 and the service network 158.

The second region 184 is centered upon an accumulator port ($P_a$) connecting to a portion of the storage network 166 which leads to the accumulator 104. To either side of the accumulator port ($P_a$) are storage ports ($P_{p1}$, $P_{p2}$) which connect to a portion of the storage network 166 which lead to the piston switching valves 136. To either side of the storage ports ($P_{p1}$, $P_{p2}$) are further service ports ($P_{s2}$, $P_{s3}$) which connect to the service network 158. To the side of the further service port ($P_{s3}$) closest to the motor 178 is a secondary accumulator port ($S_a$) connecting to the secondary accumulator 170, followed by a motor bearing lubrication port ($M_{b2}$) connected to a flow channel which provides hydraulic fluid to the motor bearings for lubrication. To the side of the further service port ($P_{s2}$) distal from the motor 178 is a further motor bearing lubrication port ($M_{b1}$).

In the second region 184, the spool 174 comprises lands which, in the centered and closed configuration of the actuator control valve 108 (FIG. 8), block the accumulator port ($P_a$), the storage ports ($P_{p1}$, $P_{p2}$) and the further service port ($P_{s2}$) distal from the motor 178. However, the secondary accumulator port ($S_a$) and the further service port ($P_{s3}$) proximate to the motor 178 are in fluid communication via a flow channel in the spool 174. This allows the hydraulic pump/motor 102 to charge the secondary accumulator 170 when the hydraulic actuator 110 is held stationary.

In the actuation configuration one (FIG. 9), the first actuator port ($S_1$) is in fluid communication with the return port ($R_{t2}$), and thus the return network 160, via a recess in the spool 174 in the first region 182. Furthermore, the second actuator port ($S_2$) is in fluid communication with the service port ($P_{s1}$), and thus the service network, 158 via another recess in the spool 174 in the first region 182. Additionally, the secondary accumulator port ($S_a$) and the further service port ($P_{s3}$) proximate to the motor 178 are still in fluid communication. Therefore, the second chamber 164 of the hydraulic actuator 110 is receiving pressure from the secondary accumulator 170.

In the actuation configuration one, the actuator control valve 108 can be used as a proportional control valve. Fine movements of the spool 174 vary the size of the flow passage between the secondary accumulator 170 and the second chamber 164 of the hydraulic actuator 110. This may allow fine positional and/or low speed control of the hydraulic actuator 110. This may be advantageous for low power demands of the hydraulic actuator 110. In the actuation configuration one, the accumulator port ($P_a$) and the storage ports ($P_{p1}$, $P_{p2}$) are still blocked.

In the actuation configuration two (FIG. 10), the second actuator port ($S_2$) is still in fluid communication with the service port ($P_{s1}$) via a recess in the spool 174 in the first region 182. However, the flow path between the secondary accumulator port ($S_a$) and the further service port ($P_{s3}$) proximate to the motor 178 has been blocked by a land in the spool 174. Therefore, the service network 158 no longer receives pressure from the secondary accumulator 170.

Instead, in the actuation configuration two, the accumulator port ($P_a$) and the storage port ($P_{p1}$) distal from the motor 178 are in fluid communication via a recess in the spool 174. The accumulator 104 can thereby pressurise and supply fluid to the portion of the storage network 166 in communication with the piston switching valves 136. In use, the controller can configure any one of the piston switching valves 136 into the storage configuration during the in-stroke of the associated pistons 124. This will cause a motoring stroke whereby energy from the accumulator 104 is transferred to the ring cam 118, and can subsequently be used to pump fluid to the second chamber of the hydraulic actuator 110.

In the actuation configuration three (FIG. 11), the second actuator port ($S_2$) is still in fluid communication with the service port ($P_{s1}$) via a recess in the spool 174 in the first region 182; the flow path between the secondary accumulator port ($S_a$) and the further service port ($P_{s3}$) proximate to the motor 178 is still blocked; and the accumulator port ($P_a$) and the storage port ($P_{p1}$) distal from the motor 178 are still in fluid communication. Additionally, the storage port ($P_{p2}$) and the further service port ($P_{s3}$) proximate to the motor 178 are in fluid communication via a recess in the spool 174. The storage network 166 is therefore connect to the service network 158 and high pressure fluid output from the accumulator 104 acts directly on the hydraulic actuator 110. This may be beneficial for high power demands and/or when it is necessary to move the hydraulic actuator 110 quickly.

In the actuation configuration three, the actuator control valve 108 can be used as a proportional control valve. Fine movements of the spool 174 vary the size of the flow passage between the accumulator 104 and the second chamber 164 of the hydraulic actuator 110. This allows the force and/or speed of the hydraulic actuator 110 to be controlled, despite the second chamber 164 being exposed to the high pressure of the accumulator 104.

In use, the controller controls the hydraulic pump/motor 102 and the actuator control valve 108 in order to cause the hydraulic actuator 110 to move on the basis of a demand. In embodiments, the demand is a target position, a target velocity, or a target applied force. The controller comprises a control loop (e.g. a closed control loop) which controls the hydraulic pump/motor 102 and the actuator control valve 108 in order to cause the hydraulic actuator 110 to attempt to meet the demand. Force transducers (not shown), position transducers (not shown) and pressure transducers 186 provide feedback to the controller.

The controller also manages the speed of the ring cam 118 by attempting to balance (i) the energy lost through the pumping strokes when driving a load with the hydraulic actuator 110 and (ii) the energy withdrawn from the accumulator 104 through motoring strokes. Losses (e.g. via friction) during the energy transfer from the accumulator 104 to the hydraulic actuator 110 are made up by the electric motor 112.

The controller is also configured to recover or harvest energy from the load by allowing the load to drive the hydraulic actuator 110. As the actuator is driven, the piston switching valves 136 are configured in the service configuration such that the pistons carry out motoring strokes and transfer energy to the ring cam 118. The energy can then subsequently be used to pump fluid to the accumulator 104, thereby storing the energy for future re-use. The hydraulic pump/motor 102 acts as a hydraulic transformer as it transfers energy between the service network 158 and the storage network 166.

Figure 12:
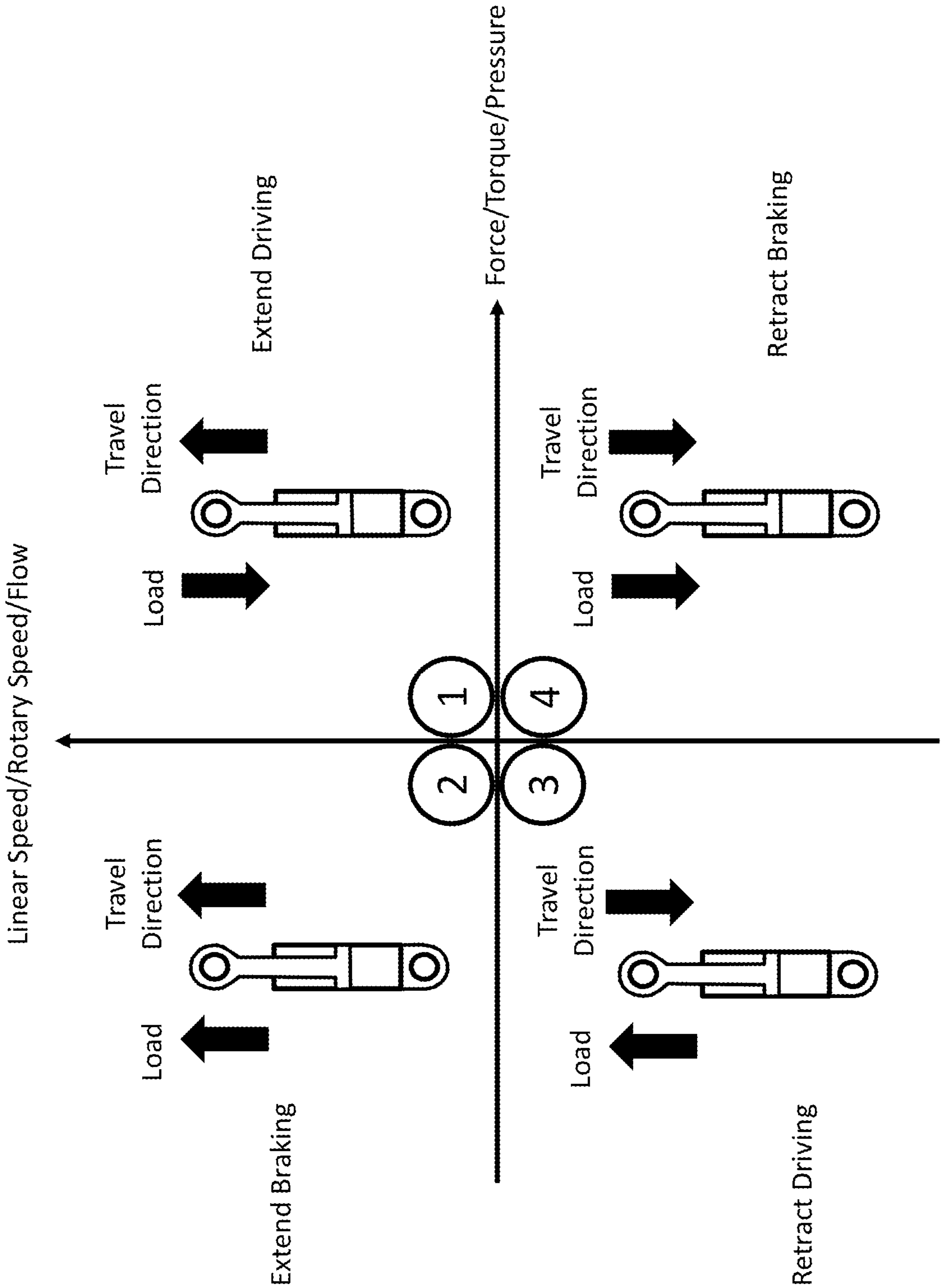
FIG. 12 illustrates the four quadrants of four quadrant control of a hydraulic actuator.

The hydraulic actuation system 100 is thus capable of four quadrant control (extending driving, extending braking, retracting driving, and retracting breaking) of the hydraulic actuator 110. FIG. 12 illustrates the four quadrants.

Figure 13:
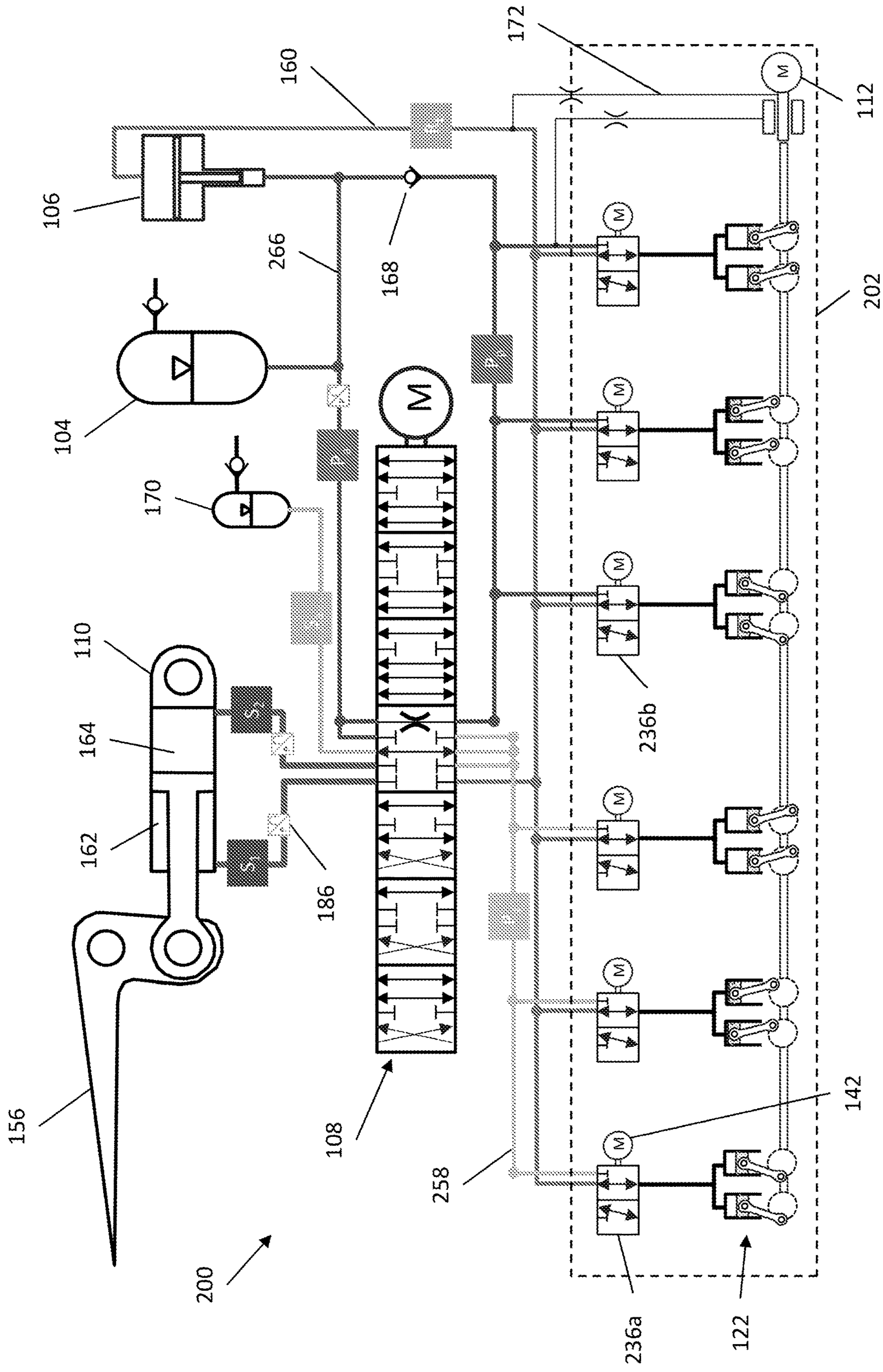
FIG. 13 shows a schematic of the hydraulic connections within a hydraulic actuation system according to a second embodiment of the disclosure.

FIG. 13 shows a schematic of the hydraulic connections within a hydraulic actuation system 200 according to a second embodiment of the disclosure. The hydraulic actuation system 200 according to the second embodiment is similar to the hydraulic actuation system 100 according to the first embodiment and like reference numerals denote like parts.

The hydraulic actuation system 200 differs from the hydraulic actuation system 100 in that piston switching valves **236*a,b* of the hydraulic pump/motor unit 202 are two-configuration (e.g. two-way) spool valves. Three of the piston switching valves 236*a* are configurable between a service configuration and a return configuration, and the other three piston switching valves 236*b*** are configurable between a storage configuration and a return configuration.

During any given control quadrant (e.g. extending driving, extending braking, retracting driving, and retracting breaking), the pumping and motoring functions of the pistons are therefore divided between the two sets of piston switching valves **236*a,b*. For example, during extending driving, the controller may control one or more of the piston switching valves 236*a* to pump fluid to the actuator in dependence on the demand, and the controller may control one or more of the piston switching valves 236*b* to receive fluid (i.e. undertake motoring strokes) from the accumulator 104 to add energy to the ring cam 118. The hydraulic pump/motor 202 therefore acts as a hydraulic transformer as it transfers energy between the service network 158 and the storage network 166**.

Figure 14:
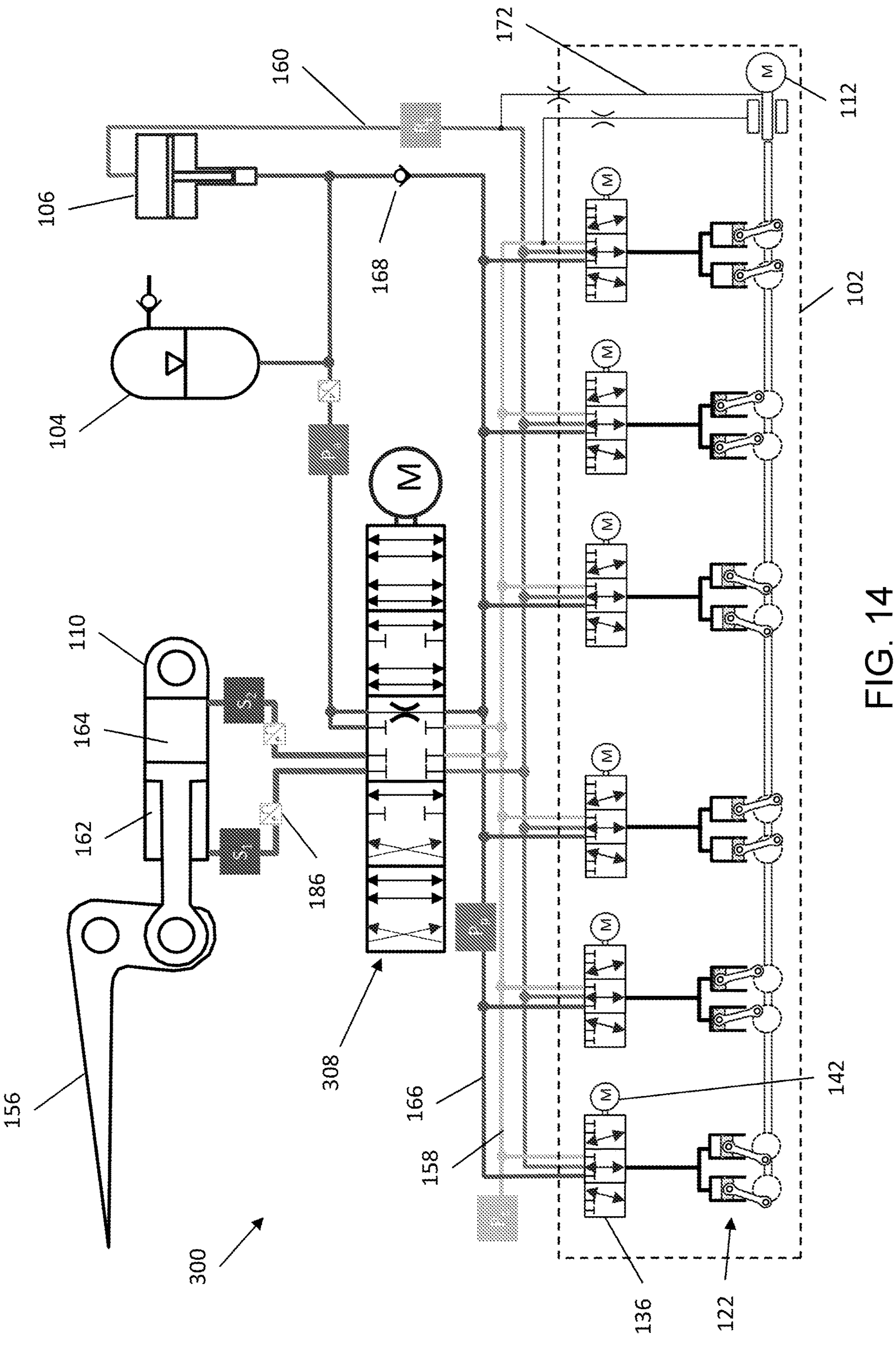
FIG. 14 shows a schematic of the hydraulic connections within a hydraulic actuation system according to a third embodiment of the disclosure.

FIG. 14 shows a schematic of the hydraulic connections within a hydraulic actuation system 300 according to a third embodiment of the disclosure. The hydraulic actuation system 300 is similar to the hydraulic actuation system 100 and like reference numerals denote like parts. The hydraulic actuation system 300 differs from the hydraulic actuation system 100 in that no secondary accumulator is present. The actuator control valve 308 therefore does not comprise the actuation configuration one, and is not configured for low power proportional control of the hydraulic actuator 110.

Figure 15:
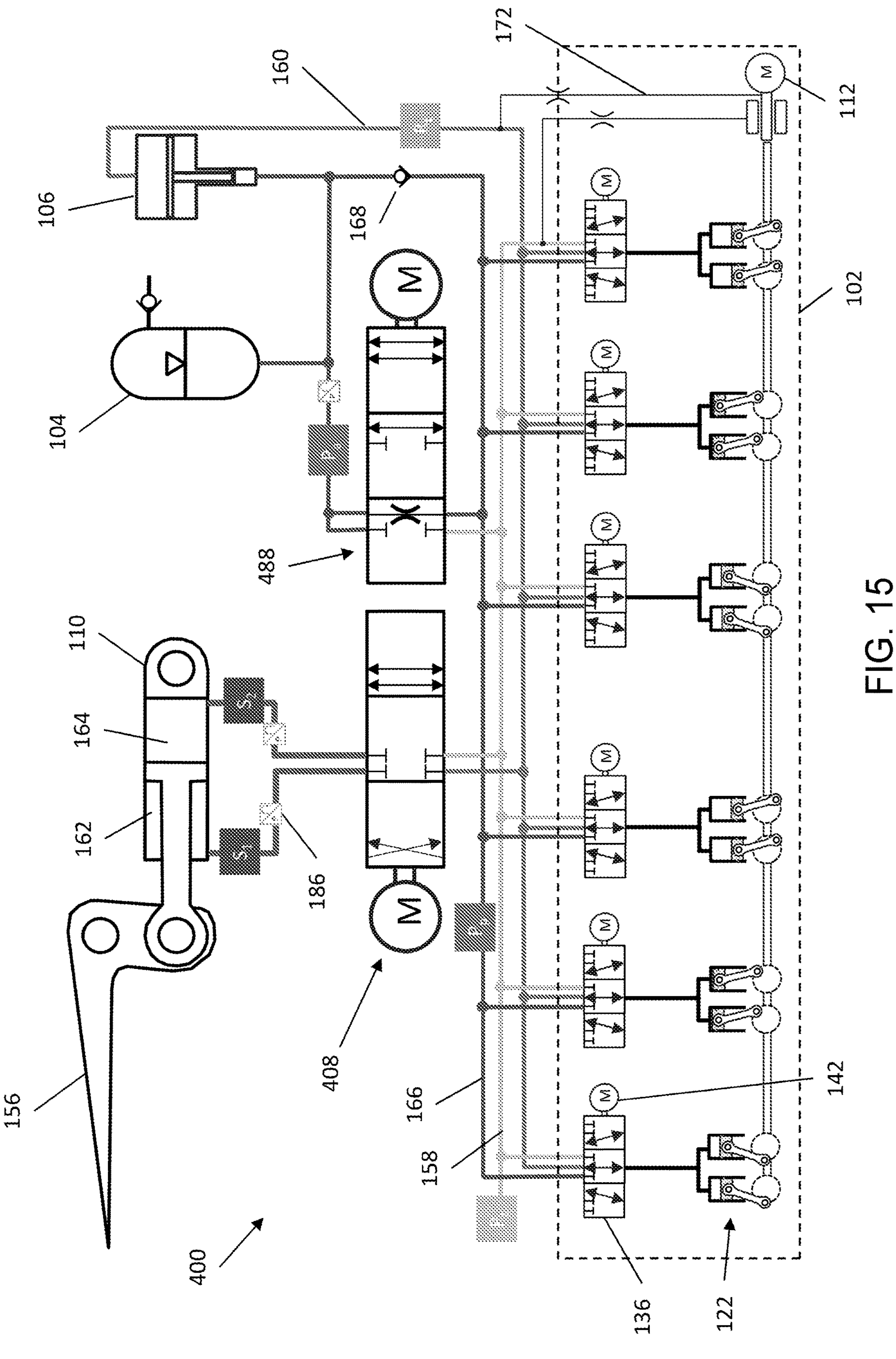
FIG. 15 shows a schematic of the hydraulic connections within a hydraulic actuation system according to a fourth embodiment of the disclosure.

FIG. 15 shows a schematic of the hydraulic connections within a hydraulic actuation system 400 according to a fourth embodiment of the disclosure. The hydraulic actuation system 400 is similar to the hydraulic actuation system 300 and like reference numerals denote like parts. The hydraulic actuation system 400 differs from the hydraulic actuation system 300 in that the actuator control valve 408 controls only the fluid flow between the service network 158, return network 166 and the hydraulic actuator 110. A separate controllable valve 488 is provided to control the connection between the accumulator 104 and the storage network 166, and the connection between the storage network 166 and the service network 158.

Whilst the present disclosure has been described and illustrated with reference to particular embodiments, it will be appreciated by those of ordinary skill in the art that the disclosure lends itself to many different variations not specifically illustrated herein. By way of example only, certain possible variations will now be described.

In alternative embodiments, the hydraulic actuation system does not comprise a flow channel arranged to connect the storage network to the service network. The actuator control valve therefore does not comprise the actuation configuration three, and is not configured for high power proportional control of the hydraulic actuator.

In alternative embodiments, the accumulator is permanently in two-way communication with the whole storage network, and there is no one-way valve (e.g. valve 168) blocking fluid flow from the accumulator to the piston arrangement, and the flow path from the accumulator to the piston switching valve arrangement does not include a controllable valve such as the actuator control valve.

In alternative embodiments, the hydraulic actuation system 400 according to a fourth embodiment may comprise a secondary accumulator which is connectable to the service network via the separate controllable valve 488, or via a second separate controllable valve.

In alternative embodiments, the energy storage device is not a gas-charged accumulator, and instead stores energy by other means, such as electrical means (e.g. in a battery) upon receipt of hydraulic fluid (e.g. upon receipt into a hydraulic generator).

In alternative embodiments, the piston switching valves are linear spool valves.

It will be appreciated that the phrases such as "first", "second", "third" actuation configuration (or actuation configuration "one", "two", "three") are merely used as a convenient way of identifying different configurations. In embodiments, the actuator control valve may, for example, be configurable to a configuration denoted herein as the "second", even without the possibility of being configured to the configurations denoted herein as "first" and/or "third".

Where in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as preferable, advantageous, convenient or the like are optional and do not limit the scope of the independent claims. Moreover, it is to be understood that such optional integers or features, whilst of possible benefit in some embodiments of the disclosure, may not be desirable, and may therefore be absent, in other embodiments.

The invention claimed is:

1. A hydraulic device comprising:

a piston arrangement comprising a plurality of pistons, wherein each of the pistons is arranged to reciprocate within a cylinder in a cycle comprising an in-stroke wherein a fluid flows into the cylinder and an out-stroke wherein the fluid flows out of the cylinder, wherein reciprocation of the pistons is collectively driven by, or drives, a rotatable piston drive element;

a piston switching valve arrangement comprising a plurality of piston switching valves, wherein each of the pistons is associated with one of the piston switching valves, wherein each of the piston switching valves is configured to control fluid flow into and out of the cylinder of the piston associated with the piston switching valve; and a controller configured to electronically control the piston switching valves;

wherein each of the piston switching valves is configurable between: a first configuration in which the cylinder of the piston associated with the piston switching valve is in fluid communication with a first port, and a second configuration in which the cylinder of the piston associated with the piston switching valve is in fluid communication with a second port, and a third configuration in which the cylinder of the piston associated with the piston switching valve is in fluid communication with a third port;

wherein the controller is configured to control the piston switching valves such that in use each of the pistons can selectively perform: (i) pumping and/or motoring, in which the fluid is transferred from one of the first or second ports to another of the first or second ports during the cycle, and (ii) idling, in which the fluid is not transferred between the first or second ports during the cycle;

wherein the controller is configured to receive a demand and control whether each of the pistons performs (i) the pumping and/or motoring, or (ii) the idling, during one or more of the cycles in response to the demand; and wherein the plurality of pistons are provided in a radial arrangement, wherein the piston arrangement is internally impinged.

2. The hydraulic device according to claim 1, wherein the rotatable piston drive element is a cam, the position of each piston being determined by an angular position of the cam relative to the piston arrangement, and wherein the cam surface is arranged such that during each revolution of the cam, each piston is driven to complete more than one cycle.

3. The hydraulic device according to claim 2, wherein the pistons each comprise a roller, and wherein the cam engages the pistons via the rollers.

4. The hydraulic device according to claim 1, wherein the piston switching valves are spool valves, wherein the configuration of each valve is defined by the position of a spool relative to a manifold.

5. The hydraulic device according to claim 4, wherein the piston switching valves are linear spool valves, wherein the configuration of each valve is defined by the linear position of the spool relative to the manifold.

6. The hydraulic device according to claim 4, wherein the piston switching valves are rotary spool valves, wherein the configuration of each valve is defined by an angular position of the spool relative to the manifold.

7. The hydraulic device according to claim 5, wherein each of the piston switching valves is individually actuated by a separate electric motor which is configured to produce rotary motion which drives the spool.

8. The hydraulic device according to claim 7, wherein each of the piston switching valves changes between configurations by the motor rotating in only one direction.

9. The hydraulic device according to claim 1, wherein the plurality of pistons comprises a first plurality of the pistons arranged in a first plane perpendicular to a rotational axis of the drive element, and a second plurality of the pistons arranged in a second plane perpendicular to the rotational axis of the drive element, the first plurality of pistons forming a first layer of pistons which is axially displaced from a second layer of pistons formed by the second plurality of pistons.

10. The hydraulic device according to claim 1, wherein each of the piston switching valves comprises a closed configuration in which the cylinder of the piston associated with the piston switching valve is not open to the first port or the second port; and wherein each cycle of each of the pistons comprises a pre-compression and/or decompression phase wherein the fluid in the cylinder associated with the piston is pre-compressed or decompressed, respectively, before the piston switching valve associated with the piston is opened.

11. The hydraulic device according to claim 1, wherein two or more of the pistons are associated with each of the piston switching valves.

12. A hydraulic system for controlling a hydraulic actuator, the hydraulic system comprising:

the hydraulic device according to claim 1;

a service network comprising one or more fluid flow channels in fluid communication with the first port of each of the piston switching valves and with an actuator control valve for controlling a flow of the fluid to the hydraulic actuator;

a return network comprising one or more fluid flow channels in fluid communication with the second port of each of the piston switching valves and with a hydraulic fluid reservoir for storing the fluid at a return pressure; and a storage network comprising one or more fluid flow channels in fluid communication with the third port of each of the piston switching valves and with an energy storage device, wherein receipt of the fluid causes the energy storage device to store energy, and wherein the energy storage device is configured to release the energy by delivering the fluid.

13. The hydraulic system according to claim 12, comprising a flow channel for connecting the storage network and the service network via a controllable valve, the controllable valve being the actuator control valve or another valve.

14. The hydraulic system according to claim 13, wherein the controllable valve for connecting the storage network and the service network is operable as a proportional control valve.

15. The hydraulic system according to claim 13, wherein the controllable valve for connecting the storage network and the service network is the actuator control valve.

16. The hydraulic system according to claim 12, further comprising a secondary energy storage device connectable to the service network via a controllable valve operable as a proportional control valve.

17. The hydraulic system according to claim 12, wherein the hydraulic system is configured to, in use:

(i) control the hydraulic actuator to drive a load using the energy stored in the energy storage device by:

the controller controlling at least one of the piston switching valves to adopt the third configuration during the in-stroke of the piston associated with the piston switching valve, such that the fluid from the storage network is received into the cylinder of said piston, thereby exerting a force on said piston and contributing to kinetic energy of the piston drive element; and the controller controlling at least one of the piston switching valves to adopt the first configuration during the out-stroke of the piston associated with the piston switching valve such that, in use, the fluid present in the cylinder of the piston associated with the piston switching valve is expelled into the service network, thereby causing the hydraulic actuator to drive the load using the energy received from the energy storage device; and/or (ii) transfer energy from the load acting on the hydraulic actuator to the energy storage device by:

the controller controlling at least one of the piston switching valves to adopt the first configuration during the in-stroke of the piston associated with the piston switching valve, such that, as the hydraulic actuator is driven by the load, the fluid in the service network is received into the cylinder of said piston, thereby exerting a force on said piston and contributing to the kinetic energy of the piston drive element; and the controller controlling at least one of the piston switching valves to adopt the third configuration during the out-stroke of the piston associated with the piston switching valve such that, in use, the fluid present in the cylinder of the piston associated with the piston switching valve is expelled into the storage network, thereby causing the energy storage device to store the energy received from the load.

18. A hydraulic system for controlling a hydraulic actuator, the hydraulic system comprising:

an actuator control valve for controlling a flow of hydraulic fluid to the hydraulic actuator, the actuator control valve comprising a service port, and a first actuator port for fluid communication with a first chamber of the hydraulic actuator;

a service network comprising one or more fluid flow channels in fluid communication with a hydraulic pump and with the service port of the actuator control valve;

a storage network for connecting to an energy storage device; and a flow channel for connecting the storage network and the service network via the actuator control valve;

wherein the actuator control valve is configurable to:

a first actuation configuration in which the first actuator port is in fluid communication with the service port, and fluid flow from the storage network to the service network is blocked, such that the actuator control valve allows, in use, the hydraulic actuator to be controlled using the hydraulic pump; and a second actuation configuration in which the first actuator port is in fluid communication with the service port, and fluid flow from the storage network to the service network is permitted, and wherein the actuator control valve is configured to provide, in use, proportional control of the hydraulic actuator using hydraulic pressure provided by the energy storage device.

19. A hydraulic device comprising:

a piston arrangement comprising a plurality of pistons, wherein each of the pistons is arranged to reciprocate within a cylinder in a cycle comprising an in-stroke wherein a fluid flows into the cylinder and an out-stroke wherein the fluid flows out of the cylinder, wherein reciprocation of the pistons is collectively driven by, or drives, a rotatable piston drive element;

a piston switching valve arrangement comprising a plurality of piston switching valves, wherein each of the pistons is associated with one of the piston switching valves, wherein each of the piston switching valves is configured to control fluid flow into and out of the cylinder of the piston associated with the piston switching valve; and a controller configured to electronically control the piston switching valves;

wherein each of the piston switching valves is configurable between: a first configuration in which the cylinder of the piston associated with the piston switching valve is in fluid communication with a first port, and a second configuration in which the cylinder of the piston associated with the piston switching valve is in fluid communication with a second port;

wherein the controller is configured to control the piston switching valves such that in use each of the pistons can selectively perform: (i) pumping and/or motoring, in which the fluid is transferred from one of the first or second ports to another of the first or second ports during the cycle, and (ii) idling, in which the fluid is not transferred between the first or second ports during the cycle;

wherein the controller is configured to receive a demand and control whether each of the pistons performs (i) the pumping and/or motoring, or (ii) the idling, during one or more of the cycles in response to the demand;

wherein the plurality of pistons are provided in a radial arrangement, wherein the piston arrangement is internally impinged; and wherein two or more of the pistons are associated with each of the piston switching valves.

* * * * *